US012670857B2

(12) United States Patent
Cherng et al.

(10) Patent No.: US 12,670,857 B2
(45) Date of Patent: Jun. 30, 2026

(54) DISPLAY DEVICE WITH DUAL DRIVING TRANSISTORS FOR BRIGHTNESS RANGE CONTROL

(71) Applicant: Innolux Corporation, Miaoli County (TW)

(72) Inventors: Yi-Shiuan Cherng, Miaoli County (TW); Chia-Hao Tsai, Miaoli County (TW); Yung-Hsun Wu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/014,269

(22) Filed: Jan. 9, 2025

(65) Prior Publication Data

US 2025/0252922 A1 Aug. 7, 2025

Related U.S. Application Data

(60) Provisional application No. 63/627,807, filed on Feb. 1, 2024.

(30) Foreign Application Priority Data

Nov. 20, 2024 (CN) ......................... 202411666203.4

(51) Int. Cl.
*G09G 3/3233* (2016.01)
*G09G 3/20* (2006.01)
*G09G 3/32* (2016.01)

(52) U.S. Cl.
CPC ......... *G09G 3/3233* (2013.01); *G09G 3/2007* (2013.01); *G09G 3/32* (2013.01);
(Continued)

(58) Field of Classification Search
CPC ...... G09G 3/3233; G09G 3/2007; G09G 3/32; G09G 2300/00; G09G 2300/0852; G09G 2300/0861; G09G 2310/08
See application file for complete search history.

(56) References Cited

U.S. PATENT DOCUMENTS 9,978,728 B2 5/2018 Lin et al.
10,304,813 B2 5/2019 Kuo et al.
(Continued)

FOREIGN PATENT DOCUMENTS

| | | | | |
|---|---|---|---|---|
| CN | 111489683 A * | 8/2020 | ............... | G09G 3/32 |
| CN | 111951718 | 11/2020 | | |
| JP | 2010008941 A * | 1/2010 | ............... | G09G 3/20 |

*Primary Examiner* — Kwang-Su Yang
(74) *Attorney, Agent, or Firm* — JCIPRNET

(57) ABSTRACT

Provided is a display device. The display device includes a pixel circuit. The pixel circuit includes a first driving transistor, a second driving transistor, and a light emitting diode. The first driving transistor is connected to a first voltage terminal. The second driving transistor is connected to the first voltage terminal. The light emitting diode has a first terminal and a second terminal. The first terminal is connected to the first driving transistor and the second driving transistor. The second terminal is connected to a second voltage terminal. When the pixel circuit presents a first brightness, the light-emitting diode obtains a first current through the first driving transistor. When the pixel circuit presents a second brightness, the light-emitting diode obtains a second current through the second driving transistor. The first brightness is higher than the second brightness. The first current is higher than the second current.

18 Claims, 12 Drawing Sheets

(52) U.S. Cl.
CPC . *G09G 2300/00* (2013.01); *G09G 2300/0852* (2013.01); *G09G 2300/0861* (2013.01); *G09G 2310/08* (2013.01)

(56) References Cited

U.S. PATENT DOCUMENTS

| | | | | |
|---|---|---|---|---|
| 11,151,950 | B2 * | 10/2021 | Chen | G09G 3/3426 |
| 11,658,262 | B1 | 5/2023 | Cheng et al. | |
| 11,699,690 | B2 | 7/2023 | Shih et al. | |
| 2006/0170624 | A1 * | 8/2006 | Yumoto | G09G 3/30<br>345/76 |
| 2014/0009456 | A1 * | 1/2014 | Kim | G09G 3/3208<br>345/82 |
| 2016/0019836 | A1 * | 1/2016 | Qing | G09G 3/3258<br>345/76 |
| 2021/0056902 | A1 * | 2/2021 | Tanaka | G09G 3/3291 |

* cited by examiner

DISPLAY DEVICE WITH DUAL DRIVING TRANSISTORS FOR BRIGHTNESS RANGE CONTROL

CROSS-REFERENCE TO RELATED APPLICATION

This application claims the priority benefits of U.S. provisional application Ser. No. 63/627,807, filed on Feb. 1, 2024, and China application serial no. 202411666203.4, filed on Nov. 20, 2024. The entirety of each of the above-mentioned patent applications is hereby incorporated by reference herein and made a part of this specification.

BACKGROUND

Technical Field

The disclosure relates to a display device, and particularly relates to a display device that can accurately control a wide brightness range.

Description of Related Art

Current display devices have high brightness display requirements. However, in order to meet the display requirements of high brightness, it is difficult for the display device to make subtle adjustments to low-brightness grayscales. For example, the display device may be any form of light emitting diode (LED) display. In the pixel circuit of the display device, the brightness provided by the LED is determined based on the duty cycle of the light-emitting enable signal. The relationship between the different duty cycles of the light-emitting enable signal and the brightness is limited by the settings of the driving circuit of the display device. Therefore, it is difficult for the display device to make subtle adjustments to low-brightness grayscales by utilizing the different duty cycles of the light-emitting enable signal.

SUMMARY

This disclosure is for a display device that can accurately control a wide brightness range.

According to an embodiment of the disclosure, the display device includes at least one pixel circuit. The at least one pixel circuit includes a first driving transistor, a second driving transistor, and a light emitting diode. The first driving transistor is electrically connected to a first voltage terminal. The second driving transistor is electrically connected to the first voltage terminal. The light emitting diode has a first terminal and a second terminal. The first terminal is electrically connected to the first driving transistor and the second driving transistor. The second terminal is electrically connected to a second voltage terminal. When the at least one pixel circuit presents a first brightness, the light emitting diode obtains a first current through the first driving transistor. When the at least one pixel circuit presents a second brightness, the light emitting diode obtains a second current through the second driving transistor. The first brightness is higher than the second brightness. The current value of the first current is higher than the current value of the second current.

According to an embodiment of the disclosure, the display device includes at least one pixel circuit. The at least one pixel circuit includes a first driving transistor, a second driving transistor, a first light emitting diode, and a second light emitting diode. The first driving transistor is electrically connected to a first voltage terminal. The second driving transistor is electrically connected to the first voltage terminal. The first light emitting diode has a first terminal and a second terminal. The first terminal of the first light emitting diode is electrically connected to the first driving transistor. The second terminal of the first light emitting diode is electrically connected to a second voltage terminal. The second light emitting diode has a first terminal and a second terminal. The first terminal of the second light emitting diode is electrically connected to the second driving transistor. The second terminal of the second light emitting diode is electrically connected to the second voltage terminal. When the at least one pixel circuit presents a first brightness, the first light emitting diode obtains a first current through the first driving transistor. When the at least one pixel circuit presents a second brightness, the second light emitting diode obtains a second current through the second driving transistor. The first brightness is higher than the second brightness. The current value of the first current is higher than the current value of the second current.

Based on the above, the first brightness is higher than the second brightness. When the pixel circuit presents the first brightness, the pixel circuit operates based on the first current. When the pixel circuit presents the second brightness, the pixel circuit operates based on the second current. The first brightness is higher than the second brightness. The current value of the first current is higher than the current value of the second current. The brightness is positively related to the grayscale. In this way, the display device can accurately control the grayscales.

DESCRIPTION OF THE EMBODIMENTS

Figure 1:
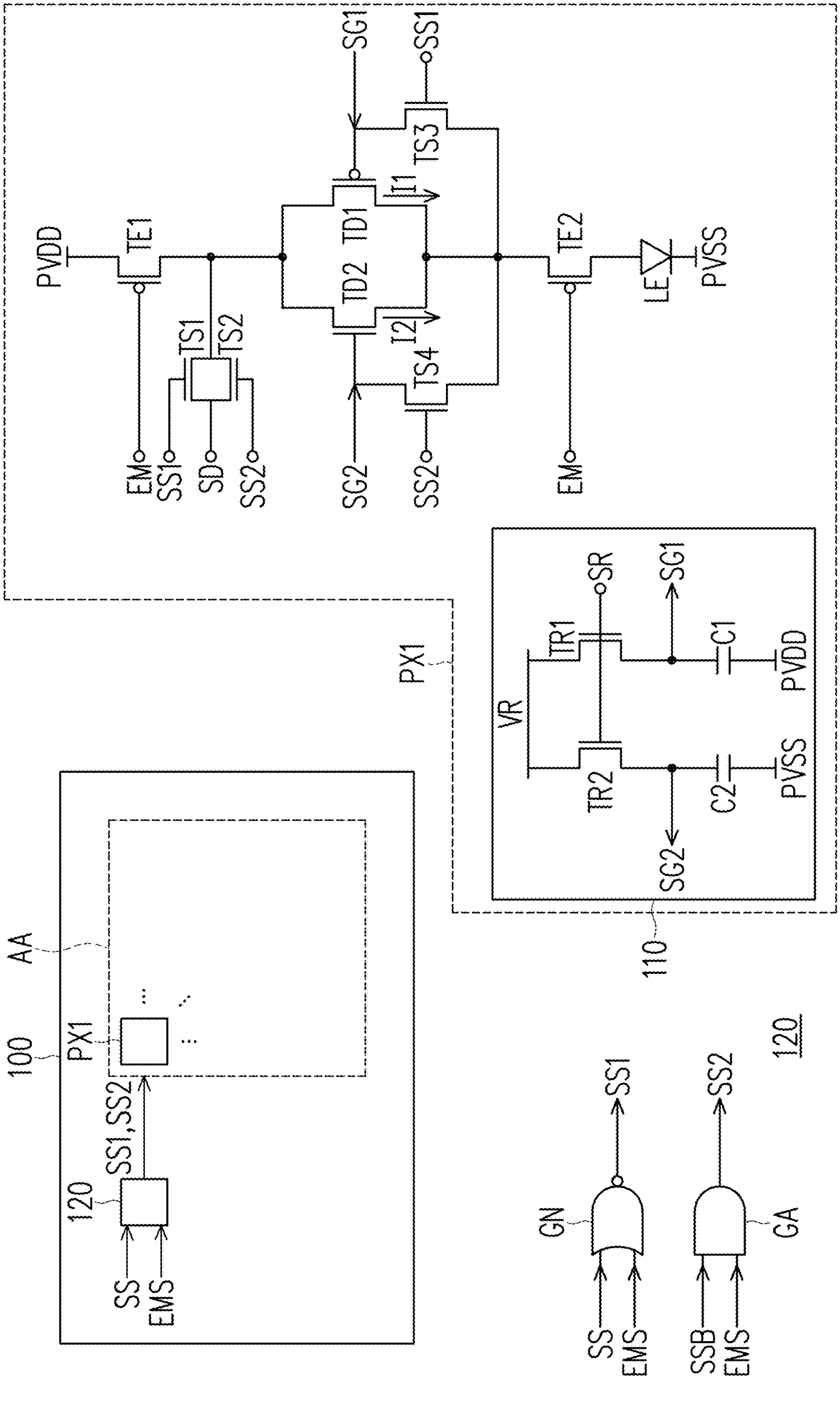
FIG. 1 is a schematic diagram of a pixel circuit of a display device according to an embodiment of the disclosure.

The disclosure may be understood by reference to the following detailed description, together with the drawings, as described below. It should be noted that for purposes of clarity of illustration and ease of understanding by the reader, each drawing of the disclosure depicts a portion of an electronic device, and certain elements in each drawing may not be drawn to scale. Furthermore, the number and size of each device depicted in the drawings are illustrative only and are not intended to limit the scope of the disclosure.

Certain terms are used throughout the description and the following claims to refer to specific elements. As persons skilled in the art will understand, electronic device manufacturers may refer to components by different names. This document does not intend to differentiate between components that have different names rather than different functions. In the following description and in the claims, the terms "include," "comprise," and "have" are used in an open-ended manner and should be interpreted to mean "including, but not limited to . . . " Therefore, when the terms "include," "comprise," and/or "have" are used in the description disclosed herein, the terms shall indicate the presence of corresponding features, regions, steps, operations, and/or elements, but are not limited to the presence of one or more corresponding features, regions, steps, operations, and/or components.

It should be understood that when a component is referred to as being "coupled to," "connected to," or "conducted to" another component, the component may be directly connected to the other component and establish a direct electrical connection, or there may be intermediate components therebetween to relay the electrical connection (indirect electrical connection). In contrast, when a component is referred to as being "directly coupled to," "directly conducted to," or "directly connected to" another component, no intermediate components exist.

Although terms such as first, second, and third may be used to describe different constituent elements, such constituent elements are not limited by the terms. The terms are only used to distinguish constituent elements from other constituent elements in the specification. The appended claims may not use the same terms, but may use the terms such as first, second, and third with respect to the order being claimed of the elements. Therefore, in the following description, the first component may be the second component in the appended claims.

The electronic device of the disclosure may include, for example, a display device, a sensing device, an antenna device, a touch device, a packaging device, a splicing device, or other suitable electronic devices, but the disclosure is not limited thereto. The display device may be any kind of display device, such as a color display device, a monochrome display device, a transparent display device, a double-sided display device, a virtual reality display device, an augmented reality display device, a 3D display device, a splicing display device, a flexible display device, a folding display device, a stretchable display device, and a rollable display device, but the disclosure is not limited thereto. In some embodiments, the display device may include a self-illuminating display device and a non-self-illuminating display device. The display device of the disclosure may include a pixel circuit. The pixel circuit may include a light emitting diode, which may include, for example, an organic light emitting diode (OLED), a mini LED, a micro LED, or a quantum dot LED (which may include QLED, QDLED), or other suitable materials, or a combination of the above, but the disclosure is not limited thereto. The antenna device may be, for example, a liquid crystal antenna, but the disclosure is not limited thereto. The antenna device may, for example, include an antenna splicing device, but the disclosure is not limited thereto. It should be noted that the electronic device may be any combination of the above, but the disclosure is not limited thereto. In addition, the shape of the electronic device may be a rectangular shape, a circular shape, a polygonal shape, a shape with curved edges, or other suitable shapes. The electronic device may have peripheral systems such as a driving system, a control system, and a light source system to support the display device, antenna device, or splicing device, but the disclosure is not limited thereto. The sensing device may include, for example, a camera, an infrared sensor, and a fingerprint sensor, but the disclosure is not limited thereto. In some embodiments, the sensing device may further include a flash lamp, an infrared (IR) light source, other sensors, electronic components, or a combination of the above, but the disclosure is not limited thereto. It should be noted that the electronic device of the disclosure may be various combinations of the above devices, but the disclosure is not limited thereto. The electronic device disclosed in the disclosure takes a display device as an example, but the disclosure is not limited thereto.

In the disclosure, the terms "pixel" or "pixel unit" are used to refer to a unit of a specific area containing at least one functional circuit for describing at least one specific function. The area of a "pixel" depends on the unit used to provide the specific function. Adjacent pixels may share the same part or conductor, but may also include their own specific components. For example, the adjacent pixels may share the same scan line or the same data line, but each pixel may also have its own transistor or capacitor.

It should be noted that technical features in different embodiments described below may be replaced, recombined, or mixed with each other to constitute another embodiment without departing from the spirit of the disclosure.

Please refer to FIG. 1. FIG. 1 is a schematic diagram of a pixel circuit of a display device according to an embodiment of the disclosure. In this embodiment, a display device 100 includes at least one pixel circuit PX1. The pixel circuit PX1 includes a first driving transistor TD1, a second driving transistor TD2, and a light emitting diode LE. The first driving transistor TD1 is electrically connected to a voltage terminal PVDD. The second driving transistor TD2 is electrically connected to the voltage terminal PVDD. The light emitting diode LE has a first terminal and a second terminal. The first terminal (for example, anode) of the light emitting diode LE is electrically connected to the first driving transistor TD1 and the second driving transistor TD2. The second terminal (for example, cathode) of the light emitting diode LE is electrically connected to a voltage terminal PVSS. The voltage value of the voltage terminal PVDD is higher than the voltage value of the voltage terminal PVSS.

In this embodiment, the light emitting diode LE may use a first current I1 to provide light of a first brightness range, and use a second current I2 to provide light of a second brightness range, where the first brightness range is greater than the second brightness range. For example, when the pixel circuit PX1 presents a first brightness (for example, the highest brightness in the first brightness range), the light emitting diode LE obtains the first current I1 through the first driving transistor TD1. When the pixel circuit PX1 presents a second brightness (for example, any brightness in the second brightness range), the light emitting diode LE obtains the second current I2 through the second driving transistor TD2. The first brightness is higher than the second brightness. The current value of the first current I1 is higher than the current value of the second current I2.

It is worth mentioning here that brightness is positively correlated with grayscale. In this way, the display device 100 may use the first current I1 to accurately control grayscale changes of the first brightness range, and use the second current I2 to accurately control grayscale changes of the second brightness range. For detailed descriptions, reference may be made to descriptions of FIG. 3, so details will be omitted here.

In this embodiment, the first terminal of the first driving transistor TD1 is electrically connected to the voltage terminal PVDD. The second terminal of the first driving transistor TD1 is electrically connected to the first terminal of the light emitting diode LE. The control terminal of the first driving transistor TD1 receives a control signal SG1. The first terminal of the second driving transistor TD2 is electrically connected to the voltage terminal PVDD. The second terminal of the second driving transistor TD2 is electrically connected to the first terminal of the light emitting diode LE. The control terminal of the second driving transistor TD2 receives a control signal SG2.

In this embodiment, the design of the first driving transistor TD1 is different from the design of the second driving transistor TD2. Therefore, the current value of the first current I1 generated by the first driving transistor TD1 is higher than the current value of the second current I2 generated by the second driving transistor TD2. For example, the material of the semiconductor layer in the first driving transistor TD1 is different from the material of the semiconductor layer in the second driving transistor TD2. In some embodiments, the first driving transistor TD1 is an LTPS thin film transistor (TFT), and the second driving transistor TD2 is an IGZO TFT. Taking this embodiment as an example, the first driving transistor TD1 may be a P-type LTPS TFT, and the second driving transistor TD2 may be an N-type IGZO TFT, but the disclosure is not limited thereto. In some embodiments, although the material of the semiconductor layer in the first driving transistor TD1 is the same as the material of the semiconductor layer in the second driving transistor TD2, other methods may be used to achieve that the current value of the first current I1 is higher than the current value of the second current I2. For example, the result may be achieved through different channel doping concentrations in the semiconductor layer, different channel width-to-length ratios, different bottom gate connection methods, different bottom gate bias voltages, or a combination of the above methods. In some embodiments, the operation of using different semiconductor materials for the first driving transistor TD1 and the second driving transistor TD2 may be combined with the operation of using different channel doping concentrations in the semiconductor layer, different channel width-to-length ratios, different bottom gate connection methods, different bottom gate bias voltages, or the foregoing methods to achieve the result. In some embodiments, the first driving transistor TD1 and the second driving transistor TD2 may be N-type transistors. In some embodiments, the first driving transistor TD1 and the second driving transistor TD2 may be P-type transistors.

In some embodiments, the doping concentration of the channel in the first driving transistor TD1 is higher than the doping concentration of the channel in the second driving transistor TD2. For another example, the channel width-to-length ratio in the first driving transistor TD1 is higher than the channel width-to-length ratio in the second driving transistor TD2. Additionally, in some embodiments, the bottom gate connection method of the first driving transistor TD1 is different from the bottom gate connection method of the second driving transistor TD2 or the bias voltage of the bottom gate of the first driving transistor TD1 is different from the bias voltage of the bottom gate of the second driving transistor TD2 (for detailed descriptions, reference may be made to descriptions of FIG. 9). The implementation that the current value of the first current I1 generated by the first driving transistor TD1 of the pixel circuit PX1 is higher than the current value of the second current I2 generated by the second driving transistor TD2 is applicable to all embodiments of the disclosure, so details will not be repeated in the following description.

Taking this embodiment as an example, the pixel circuit PX1 further includes light-emitting control transistors TE1, TE2 and scan transistors TS1 to TS4. The first terminal of the light-emitting control transistor TE1 is electrically connected to the voltage terminal PVDD. The second terminal of the light-emitting control transistor TE1 is electrically connected to the first terminal of the first driving transistor TD1 and the first terminal of the second driving transistor TD2. The control terminal of the light-emitting control transistor TE1 receives a light-emitting enable signal EM. The first terminal of the light-emitting control transistor TE2 is electrically connected to the second terminal of the first driving transistor TD1 and the second terminal of the second driving transistor TD2. The second terminal of the light-emitting control transistor TE2 is electrically connected to the first terminal of the light emitting diode LE. The control terminal of the light-emitting control transistor TE2 receives the light-emitting enable signal EM.

The first terminal of the scan transistor TS1 receives a data signal SD. The second terminal of the scan transistor TS1 is electrically connected to the first terminal of the first driving transistor TD1 and the first terminal of the second driving transistor TD2. The control terminal of the scan transistor TS1 receives a first scan signal SS1. The first terminal of the scan transistor TS2 receives the data signal SD. The second terminal of the scan transistor TS2 is electrically connected to the first terminal of the first driving transistor TD1 and the first terminal of the second driving transistor TD2. The control terminal of the scan transistor TS2 receives a second scan signal SS2.

The first terminal of the scan transistor TS3 is electrically connected to the control terminal of the first driving transistor TD1. The second terminal of the scan transistor TS3 is electrically connected to the second terminal of the first driving transistor TD1. The control terminal of the scan transistor TS3 receives the first scan signal SS1. The first terminal of the scan transistor TS4 is electrically connected to the control terminal of the second driving transistor TD2. The second terminal of the scan transistor TS4 is electrically connected to the second terminal of the second driving transistor TD2. The control terminal of the scan transistor TS3 receives the second scan signal SS2.

In this embodiment, the light-emitting control transistors TE1 and TE2 are respectively implemented by, for example, P-type transistors, but the disclosure is not limited thereto. The scan transistors TS1 to TS4 are respectively implemented by, for example, N-type transistors, but the disclosure is not limited thereto.

In this embodiment, the pixel circuit PX1 further includes a control signal generation circuit 110. The control signal generation circuit 110 generates the control signals SG1 and SG2 based on a reference voltage VR and a reference signal SR. The control signal generation circuit 110 includes control transistors TR1 and TR2 and capacitors C1 and C2. The first terminal of the control transistor TR1 is electrically connected to the reference voltage VR. The control terminal of the control transistor TR1 receives a reference signal SR.

The second terminal of the control transistor TR1 provides the control signal SG1. The first terminal of the control transistor TR2 is electrically connected to the reference voltage VR. The control terminal of the control transistor TR2 receives the reference signal SR. The second terminal of the control transistor TR2 provides the control signal SG2. The capacitor C1 is electrically connected between the second terminal of the control transistor TR1 and the voltage terminal PVDD. The capacitor C2 is electrically connected between the second terminal of the control transistor TR2 and the voltage terminal PVSS.

In this embodiment, the control transistors TR1 and TR2 are respectively implemented by, for example, N-type transistors, but the disclosure is not limited thereto.

In this embodiment, the display device 100 further includes a logic circuit 120. The logic circuit 120 is electrically connected to the pixel circuit PX1. The logic circuit 120 generates the first scan signal SS1 and the second scan signal SS2 according to a scan enable signal EMS, a scan signal SS, and an inverted scan signal SSB. The inverted scan signal SSB may be the complementary signal of the scan signal SS. The scan signal SS and the inverted scan signal SSB may be generated by a gate driving circuit (for example, GOP), but the disclosure is not limited thereto.

In this embodiment, the logic circuit 120 includes a NOR logic gate GN and an AND logic gate GA. The first input terminal of the NOR logic gate GN receives the scan signal SS. The second input terminal of the NOR logic gate GN receives the scan enable signal EMS. The NOR logic gate GN performs a NOR logic operation on the scan signal SS and the scan enable signal EMS to generate the first scan signal SS1. The output terminal of the NOR logic gate GN outputs the first scan signal SS1. The first input terminal of the AND logic gate GA receives the inverted scan signal SSB. The second input terminal of the AND logic gate GA receives the scan enable signal EMS. The AND logic gate GA performs an AND logic operation on the inverted scan signal SSB and the scan enable signal EMS to generate the second scan signal SS2. The output terminal of the AND logic gate GA outputs the second scan signal SS2.

Figure 2:
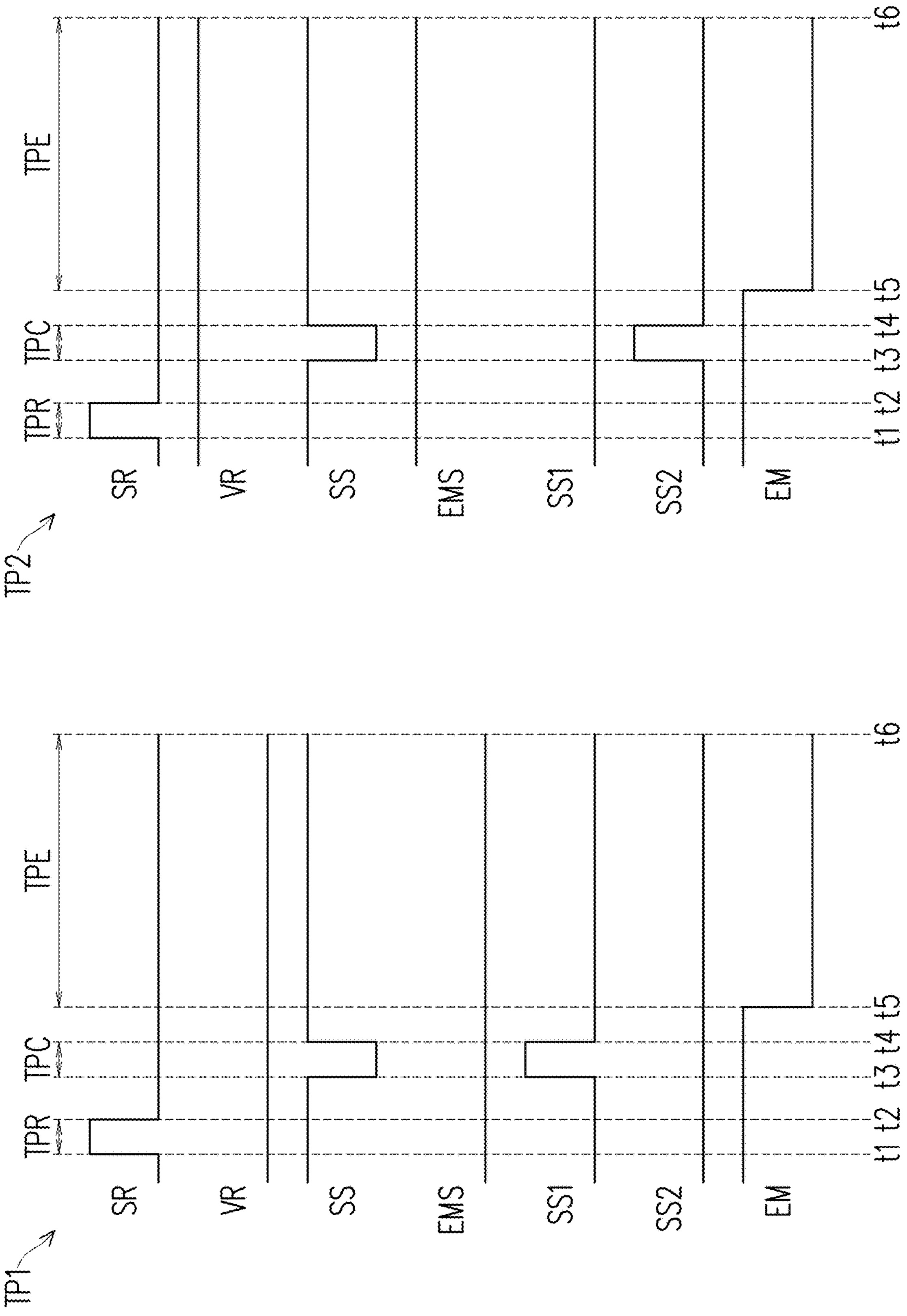
FIG. 2 is a signal timing diagram according to an embodiment of the disclosure.

In this embodiment, the pixel circuit PX1 and the control signal generation circuit 110 may be disposed in an active area AA of the display device 100. The logic circuit 120 may be disposed outside the active area AA of the display device 100, but the disclosure is not limited thereto. For example, the scan signal SS and the inverted scan signal SSB may be provided by the gate driving circuit (for example, gate driver on panel, GOP), but the disclosure is not limited thereto. Please refer to FIG. 1 and FIG. 2. FIG. 2 is a signal timing diagram according to an embodiment of the disclosure. FIG. 2 shows a signal timing diagram TP1 presenting the first brightness range and a signal timing diagram TP2 presenting the second brightness range. In this embodiment, the first driving transistor TD1 is a P-type LTPS TFT, and the second driving transistor TD2 is an N-type IGZO TFT. In this embodiment, taking the presentation of the first brightness range as an example, the voltage value of the reference voltage VR is a low voltage value, and the voltage value of the scan enable signal EMS is a low voltage value. When a brightness of the first brightness range is presented, for example, the first brightness is presented, the first driving transistor TD1 receives the data signal SD according to the first scan signal SS1, and generates the first current I1 according to the data signal SD.

During a reset period TPR at a time point t1 and a time point t2, the voltage value of the reference signal SR is a high voltage value. The control transistors TR1 and TR2 are turned on. Therefore, the voltage values of the control signals SG1 and SG2 are low voltage values respectively. The first driving transistor TD1 is turned on according to the control signal SG1, while the second driving transistor TD2 is turned off.

During the reset period TPR, the voltage value of the scan signal SS is a high voltage value. The voltage values of the first scan signal SS1 and the second scan signal SS2 are low voltage values respectively. Therefore, the scan transistors TS1 to TS4 are turned off. In addition, during the reset period TPR, the voltage value of the light-emitting enable signal EM is a high voltage value. Therefore, the light-emitting control transistors TE1 and TE2 are turned off.

During a compensation period TPC at a time point t3 and a time point t4, the voltage value of the reference signal SR is a low voltage value. The control transistors TR1 and TR2 are turned off. The control terminal of the first driving transistor TD1 is floated. During the compensation period TPC, the voltage value of the scan signal SS is a low voltage value. The voltage value of the first scan signal SS1 is a high voltage value. The voltage value of the second scan signal SS2 is a low voltage value. Therefore, the scan transistors TS1 and TS3 are turned on. The scan transistors TS2 and TS4 are turned off. The scan transistor TS1 transmits the data signal SD to the first terminal of the first driving transistor TD1. Since the first driving transistor TD1 and the scan transistor TS3 are turned on, the voltage value at the control terminal of the first driving transistor TD1 is equal to a sum (that is, VSD+Vth) of a threshold voltage value (Vth) of the first driving transistor TD1 and a voltage value (VSD) of the data signal SD. Therefore, during the compensation period TPC, the voltage value at the control terminal of the first driving transistor TD1 has the voltage value of the data signal SD and is compensated based on the threshold voltage value of the first driving transistor TD1.

During a light emitting period TPE between a time point t5 and a time point t6, the voltage value of the reference signal SR is a low voltage value. The control transistors TR1 and TR2 are turned off. The voltage value of the scan signal SS is a high voltage value. The voltage values of the first scan signal SS1 and the second scan signal SS2 are low voltage values respectively. Therefore, the scan transistors TS1 to TS4 are turned off. In addition, during the light emitting period TPE, the voltage value of the light-emitting enable signal EM is a low voltage value. The light-emitting control transistors TE1 and TE2 are turned on. Therefore, the first driving transistor TD1 generates the first current I1 according to the voltage value at the control terminal of the first driving transistor TD1.

Taking the second brightness range as an example, the voltage value of the reference voltage VR is a high voltage value. The voltage value of the scan enable signal EMS is a high voltage value. When a brightness of the second brightness range is presented, for example, the second brightness is presented, the second driving transistor TD2 receives the data signal SD according to the second scan signal SS2, and generates the second current I2 according to the data signal SD.

During the reset period TPR at the time point t1 and the time point t2, the voltage value of the reference signal SR is a high voltage value. The control transistors TR1 and TR2 are turned on. Therefore, the voltage values of control signals SG1 and SG2 are high voltage values respectively. The first driving transistor TD1 is turned off. The second driving transistor TD2 is turned on according to the control signal SG2.

During the compensation period TPC at the time point t3 and the time point t4, the voltage value of the reference signal SR is a low voltage value. The control transistors TR1 and TR2 are turned off. The control terminal of the second driving transistor TD2 is floated. During the compensation period TPC, the voltage value of the scan signal SS is a low voltage value. The voltage value of the first scan signal SS1 is a low voltage value. The voltage value of the second scan signal SS2 is a high voltage value. Therefore, the scan transistors TS1 and TS3 are turned off. The scan transistors TS2 and TS4 are turned on. The scan transistor TS2 transmits the data signal SD to the first terminal of the second driving transistor TD2. Since the second driving transistor TD2 and the scan transistor TS4 are turned on, the voltage value at the control terminal of the second driving transistor TD2 is equal to the sum (that is, VSD+Vth) of the threshold voltage value (Vth) of the second driving transistor TD2 and the voltage value (VSD) of the data signal SD. Therefore, during the compensation period TPC, the voltage value at the control terminal of the second driving transistor TD2 has the voltage value of the data signal SD and is compensated based on the threshold voltage value of the second driving transistor TD2.

During the light emitting period TPE between the time point t5 and the time point t6, the voltage value of the reference signal SR is a low voltage value. The control transistors TR1 and TR2 are turned off. The voltage value of the scan signal SS is a high voltage value. The voltage values of the first scan signal SS1 and the second scan signal SS2 are low voltage values respectively. Therefore, the scan transistors TS1 to TS4 are turned off. In addition, during the light emitting period TPE, the voltage value of the light-emitting enable signal EM is a low voltage value. The light-emitting control transistors TE1 and TE2 are turned on. Therefore, the second driving transistor TD2 generates the second current I2 according to the voltage value at the control terminal of the second driving transistor TD2.

In this embodiment, all pixel circuits PX1 in the display device 100 may uniformly perform the operation of the signal timing diagram TP1 or uniformly perform the operation of the signal timing diagram TP2. The operation may be referred to as a full-screen driving mode. In this embodiment, all pixel circuits PX1 may uniformly perform the operation of the signal timing diagram TP1 when the ambient brightness is high, and uniformly perform the operation of the signal timing diagram TP2 when the ambient brightness is low, but the disclosure is not limited thereto.

Figure 3:
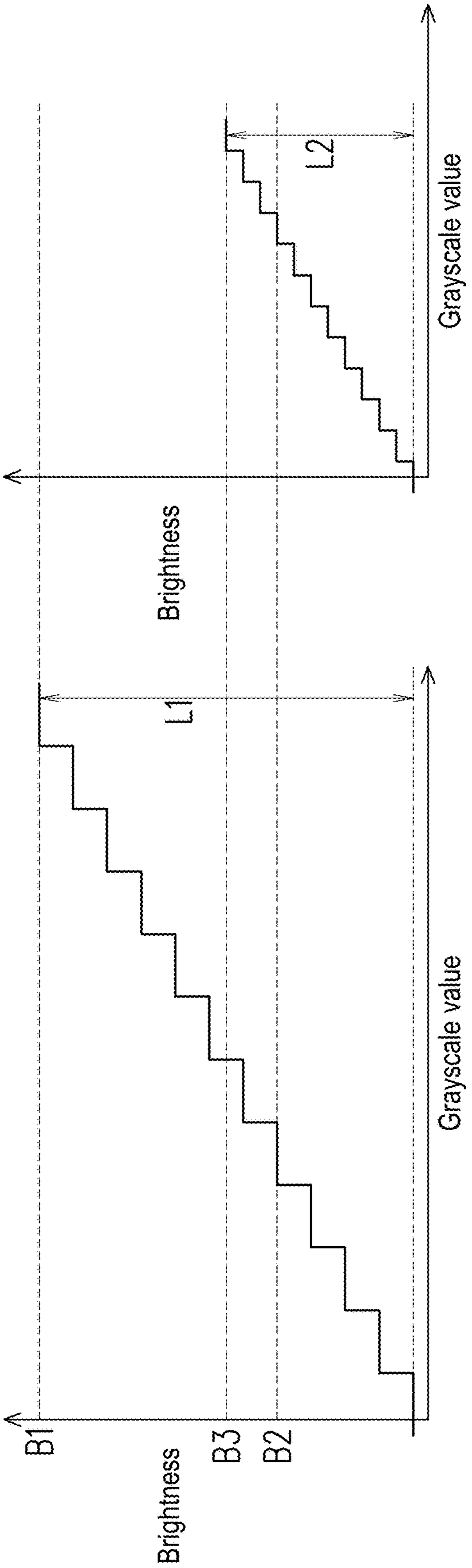
FIG. 3 is a schematic diagram of a brightness range according to an embodiment of the disclosure.

Please refer to FIG. 1 and FIG. 3. FIG. 3 is a schematic diagram of the brightness range according to an embodiment of the disclosure. FIG. 3 shows a first brightness range L1 and a second brightness range L2. The first brightness range is greater than the second brightness range, and the first brightness range L1 partially overlaps the second brightness range L2. A first brightness B1 may correspond to any brightness in the first brightness range L1, a second brightness B2 may correspond to any brightness in the second brightness range L2. In some embodiments, the first brightness B1 is higher than the second brightness B2. For example, the first brightness B1 may be the highest brightness of the display device 100, or the first brightness B1 may be the highest brightness in the first brightness range L1, but the disclosure is not limited thereto. In this embodiment, the display device 100 may be driven by the first driving transistor TD1, so that the pixel circuit PX1 may present the grayscale change of the first brightness range L1. The display device 100 may be driven by the second driving transistor TD2, so that the pixel circuit PX1 may present the grayscale change of the second brightness range L2.

In this embodiment, the first brightness range L1 is determined by a first grayscale value (for example, "0" to "255"). The first grayscale value is determined by the first current I1 provided by the first driving transistor TD1. The first current I1 is determined by the voltage value of the data signal SD. Similarly, the second brightness range L2 is determined by a second grayscale value (for example, "0" to "255"). The second grayscale value is determined by the second current I2 provided by the second driving transistor TD2. The second current I2 is determined by the voltage value of the data signal SD. It should be noted that the current value of the second current I2 is lower than the current value of the first current I1. Therefore, for the same grayscale value, the brightness presented by driving through the first driving transistor TD1 is different from the brightness presented by driving through the second driving transistor TD2. For example, the first grayscale and the second grayscale are both "255", the brightness presented by driving through the first driving transistor TD1 is the first brightness B1, and the brightness presented by driving through the second driving transistor TD2 is a third brightness B3, where the first brightness B1 is greater than the third brightness B3. In some embodiments, the difference between the two brightnesses in the first brightness range L1 corresponding to mth and (m+1)th grayscale values is greater than the difference between the two brightnesses in the second brightness range L2 corresponding to mth and (m+1)th grayscale values. Therefore, based on the second current I2 and the second brightness range L2, the pixel circuit PX1 can present finer brightness changes. In some embodiments, the foregoing design allows the display device 100 to present better image grayscale changes when the ambient brightness is low, which reduces discomfort for human eyes when viewing the image, but the disclosure is not limited thereto.

In the full-screen driving mode, when all pixel circuits PX1 in the display device 100 present the first grayscale value, the grayscale values presented by all the pixel circuits PX1 are within the first brightness range L1. In the full-screen driving mode, when all pixel circuits PX1 in the display device 100 present the second grayscale value, the grayscale values presented by all the pixel circuits PX1 are within the second brightness range L2.

Figure 4:
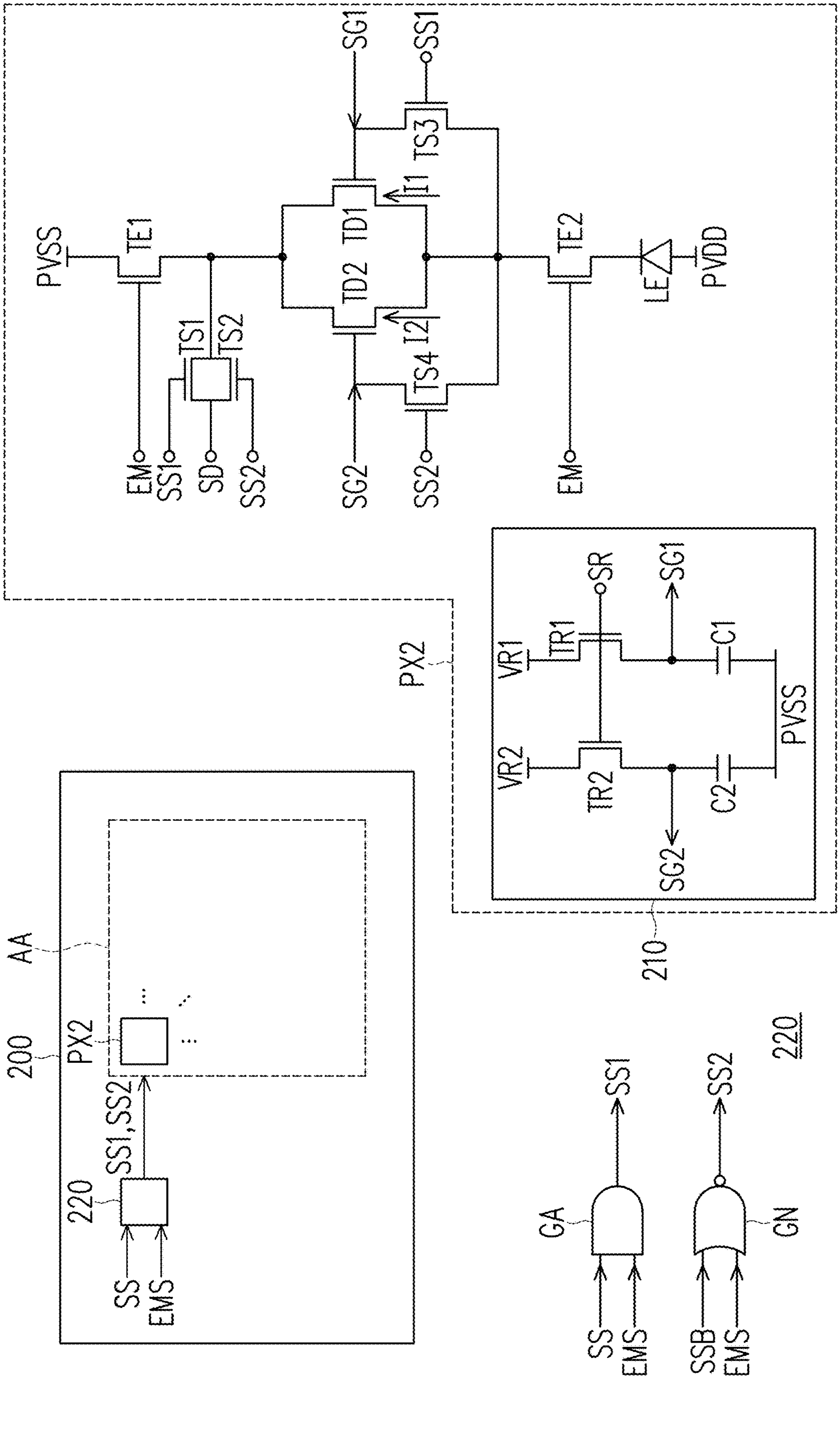
FIG. 4 is a schematic diagram of the pixel circuit of the display device according to an embodiment of the disclosure.

Please refer to FIG. 4. FIG. 4 is a schematic diagram of the pixel circuit of the display device according to an embodiment of the disclosure. In this embodiment, a display device 200 includes at least one pixel circuit PX2. The pixel circuit PX2 includes the first driving transistor TD1, the second driving transistor TD2, light-emitting control transistors TE1, TE2, the scan transistors TS1 to TS4, and the light emitting diode LE. In this embodiment, when the pixel circuit PX2 presents the first brightness (for example, the highest brightness in the first brightness range), the light emitting diode LE obtains the first current I1 through the first driving transistor TD1. When the pixel circuit PX2 presents the second brightness (for example, any brightness in the second brightness range), the light emitting diode LE obtains the second current I2 through the second driving transistor TD2. The first brightness is higher than the second brightness. The current value of the first current I1 is higher than the current value of the second current I2.

In this embodiment, the first terminal of the light-emitting control transistor TE1 is electrically connected to the voltage terminal PVSS. The second terminal of the light-emitting control transistor TE1 is electrically connected to the first terminal of the first driving transistor TD1 and the first terminal of the second driving transistor TD2. The control terminal of the light-emitting control transistor TE1 receives the light-emitting enable signal EM. The first terminal of the light-emitting control transistor TE2 is electrically connected to the second terminal of the first driving transistor TD1 and the second terminal of the second driving transistor TD2. The second terminal of the light-emitting control transistor TE2 is electrically connected to the first terminal (for example, cathode) of the light emitting diode LE. The control terminal of the light-emitting control transistor TE2 receives the light-emitting enable signal EM. The second terminal (for example, anode) of the light emitting diode LE is connected to the voltage terminal PVDD. The voltage value of the voltage terminal PVDD is higher than the voltage value of the voltage terminal PVSS.

The first terminal of the scan transistor TS1 receives the data signal SD. The second terminal of the scan transistor TS1 is electrically connected to the first terminal of the first driving transistor TD1 and the first terminal of the second driving transistor TD2. The control terminal of the scan transistor TS1 receives the first scan signal SS1. The first terminal of the scan transistor TS2 receives the data signal SD. The second terminal of the scan transistor TS2 is electrically connected to the first terminal of the first driving transistor TD1 and the first terminal of the second driving transistor TD2. The control terminal of the scan transistor TS2 receives the second scan signal SS2.

The first terminal of the scan transistor TS3 is electrically connected to the control terminal of the first driving transistor TD1. The second terminal of the scan transistor TS3 is electrically connected to the second terminal of the first driving transistor TD1. The control terminal of the scan transistor TS3 receives the first scan signal SS1. The first terminal of the scan transistor TS4 is electrically connected to the control terminal of the second driving transistor TD2. The second terminal of the scan transistor TS4 is electrically connected to the second terminal of the second driving transistor TD2. The control terminal of the scan transistor TS3 receives the second scan signal SS2.

In this embodiment, the light-emitting control transistors TE1 and TE2 and the scan transistors TS1 to TS4 are respectively implemented by, for example, N-type transistors, but the disclosure is not limited thereto.

In this embodiment, the design of the first driving transistor TD1 is different from the design of the second driving transistor TD2. Therefore, the current value of the first current I1 generated by the first driving transistor TD1 is higher than the current value of the second current I2 generated by the second driving transistor TD2. For example, the material of the semiconductor layer in the first driving transistor TD1 is different from the material of the semiconductor layer in the second driving transistor TD2. Taking this embodiment as an example, the first driving transistor TD1 may be an N-type LTPS TFT, and the second driving transistor TD2 may be an N-type IGZO TFT, but the disclosure is not limited thereto. In some embodiments, through different channel doping concentrations, different channel width-to-length ratios, different bottom gate connection methods, different bottom gate bias voltages, or a combination of the above methods, the operation may achieve the result that the current value of the first current I1 is higher than the current value of the second current I2. In some embodiments, the first driving transistor TD1 and the second driving transistor TD2 may be N-type transistors. In some embodiments, the first driving transistor TD1 and the second driving transistor TD2 may be P-type transistors.

In this embodiment, the pixel circuit PX2 further includes a control signal generation circuit 210. The control signal generation circuit 210 is electrically connected to the pixel circuit PX2. The control signal generation circuit 210 generates the control signals SG1 and SG2. The control signal generation circuit 210 includes the control transistors TR1 and TR2 and the capacitors C1 and C2. The first terminal of the control transistor TR1 is electrically connected to a reference voltage VR1. The control terminal of the control transistor TR1 receives the reference signal SR. The second terminal of the control transistor TR1 provides the control signal SG1. The first terminal of the control transistor TR2 is electrically connected to a reference voltage VR2. The control terminal of the control transistor TR2 receives the reference signal SR. The second terminal of the control transistor TR2 provides the control signal SG2. The capacitor C1 is electrically connected between the second terminal of the control transistor TR1 and the voltage terminal PVSS (or the voltage terminal PVDD). The capacitor C2 is electrically connected between the second terminal of the control transistor TR2 and the voltage terminal PVSS (or the voltage terminal PVDD).

In this embodiment, when the pixel circuit PX2 presents a brightness of the first brightness range (such as the first brightness), the voltage value of the reference voltage VR1 is equal to a high voltage value, and the voltage value of the reference voltage VR2 is equal to a low voltage value. When the pixel circuit PX2 presents a brightness of the second brightness range (such as the second brightness), the voltage value of the reference voltage VR1 is equal to a low voltage value, and the voltage value of the reference voltage VR2 is equal to a high voltage value.

In this embodiment, the first driving transistor TD1 receives the control signal SG1. The second driving transistor TD2 receives the control signal SG2. When the pixel circuit PX2 presents a brightness of the first brightness range (such as the first brightness), the first driving transistor TD1 is turned on according to the control signal SG1 during the reset period. When the pixel circuit PX2 presents a brightness of the second brightness range (such as the second brightness), the second driving transistor TD2 is turned on according to the control signal SG2 during the reset period.

In this embodiment, the control transistors TR1 and TR2 are respectively implemented by, for example, N-type transistors, but the disclosure is not limited thereto.

In this embodiment, the display device 200 further includes a logic circuit 220. The logic circuit 220 is electrically connected to the pixel circuit PX2. The logic circuit 220 generates the first scan signal SS1 and the second scan signal SS2 according to the scan enable signal EMS, the scan signal SS, and the inverted scan signal SSB. The inverted scan signal SSB may be the complementary signal of the scan signal SS. The scan signal SS and the inverted scan signal SSB may be generated by the gate driving circuit (for example, GOP), but the disclosure is not limited thereto.

In this embodiment, the logic circuit 220 includes the AND logic gate GA and the NOR logic gate GN. The first input terminal of the AND logic gate GA receives the scan signal SS. The second input terminal of the AND logic gate GA receives the scan enable signal EMS. The AND logic gate GA performs an AND logic operation on the scan signal SS and the scan enable signal EMS to generate the first scan signal SS1. The output terminal of the AND logic gate GA outputs the first scan signal SS1. The first input terminal of the NOR logic gate GN receives the inverted scan signal SSB. The second input terminal of the NOR logic gate GN receives the scan enable signal EMS. A NOR logic gate GN2 performs a NOR logic operation on the inverted scan signal SSB and the scan enable signal EMS to generate the second scan signal SS2. The output terminal of the NOR logic gate GN outputs the second scan signal SS2. Referring to FIG. 1 and FIG. 4, in a modified embodiment of the pixel circuits PX1 and PX2, the scan transistor TS1 and the scan transistor TS2 may be replaced by one scan transistor. The first terminal of the scan transistor receives the data signal SD. The second terminal of the scan transistor is electrically connected to the first terminal of the first driving transistor TD1 and the first terminal of the second driving transistor TD2. The control terminal of the scan transistor receives the scan signal SS. The control signals SG1 and SG2 may be provided by the control signal generation circuit 210.

In a modified embodiment of the pixel circuit PX1, the first driving transistor TD1 and the second driving transistor TD2 may be P-type LTPS TFTs. In the modified embodiment, the control signals SG1 and SG2 may be provided by the control signal generation circuit. In the above modified embodiment, what is different from the control signal generation circuit 110 is that the first terminal of the control transistor TR1 is electrically connected to the reference voltage VR1. The first terminal of the control transistor TR2 is electrically connected to reference voltage VR2. The capacitor C2 is electrically connected between the second terminal of the control transistor TR2 and the voltage terminal PVDD. In a modified embodiment of the pixel circuit PX2, the first driving transistor TD1 and the second driving transistor TD2 may be N-type LTPS TFTs.

In this embodiment, the pixel circuit PX2 is applicable to the first brightness range L1 and the second brightness range L2 as shown in FIG. 3. The pixel circuit PX2 may be applied to the full-screen driving mode.

Figure 5:
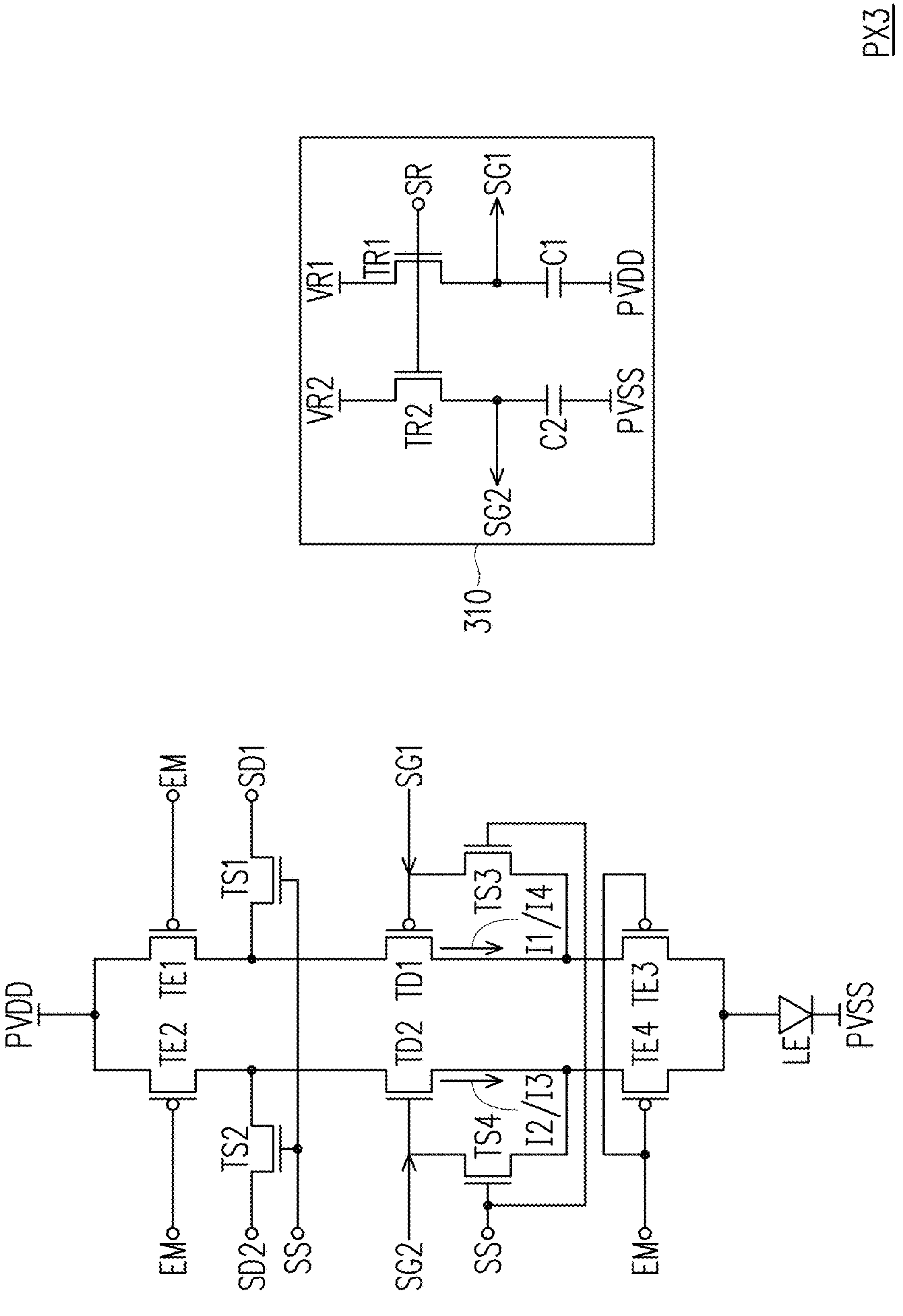
FIG. 5 is a schematic diagram of the pixel circuit according to an embodiment of the disclosure.

Please refer to FIG. 5. FIG. 5 is a schematic diagram of the pixel circuit according to an embodiment of the disclosure. In this embodiment, a pixel circuit PX3 includes the first driving transistor TD1, the second driving transistor TD2, the light-emitting control transistors TE1 to TE4, the scan transistors TS1 to TS4, and the light emitting diode LE. In this embodiment, when the pixel circuit PX3 presents the first brightness (for example, the highest brightness or any brightness in the first brightness range), the light emitting diode LE obtains the first current I1 through the first driving transistor TD1 and obtains a third current I3 through the second driving transistor TD2. When the pixel circuit PX3 presents the second brightness (for example, any brightness in the second brightness range), the light emitting diode LE obtains a fourth current I4 through the first driving transistor TD1 and obtains the second current I2 through the second driving transistor TD2. The first brightness is higher than the second brightness. The current value of the first current I1 is higher than the current value of the second current I2.

In some embodiments, when the pixel circuit PX3 presents the first brightness, the first current I1 provided by the first driving transistor TD1 is higher than the third current I3 provided by the second driving transistor TD2. In some embodiments, when the pixel circuit PX3 presents the second brightness, the fourth current I4 provided by the first driving transistor TD1 is lower than the second current I2 provided by the second driving transistor TD2. For example, the fourth current I4 may be equal to 0.

It is worth mentioning here that the display device may use the first current I1 and the third current I3 to accurately control the grayscale changes of the first brightness range, and use the second current I2 and the fourth current I4 to accurately control the grayscale changes of the second brightness range. For detailed descriptions, reference may be made to descriptions of FIG. 6, so details will be omitted here.

In this embodiment, the first terminal of the light-emitting control transistor TE1 is electrically connected to the voltage terminal PVDD. The second terminal of the light-emitting control transistor TE1 is electrically connected to the first terminal of the first driving transistor TD1. The control terminal of the light-emitting control transistor TE1 receives the light-emitting enable signal EM. The first terminal of the light-emitting control transistor TE2 is electrically connected to the voltage terminal PVDD. The second terminal of the light-emitting control transistor TE2 is electrically connected to the first terminal of the second driving transistor TD2. The control terminal of the light-emitting control transistor TE2 receives the light-emitting enable signal EM.

The first terminal of the light-emitting control transistor TE3 is electrically connected to the second terminal of the first driving transistor TD1. The second terminal of the light-emitting control transistor TE3 is electrically connected to the first terminal of the light emitting diode LE. The control terminal of the light-emitting control transistor TE3 receives the light-emitting enable signal EM. The first terminal of the light-emitting control transistor TE4 is electrically connected to the second terminal of the second driving transistor TD2. The second terminal of the light-emitting control transistor TE4 is electrically connected to the first terminal (for example, anode) of the light emitting diode LE. The control terminal of the light-emitting control transistor TE4 receives the light-emitting enable signal EM.

The second terminal (for example, cathode) of the light emitting diode LE is connected to the voltage terminal PVSS. The voltage value of the voltage terminal PVDD is higher than the voltage value of the voltage terminal PVSS.

The first terminal of the scan transistor TS1 receives a data signal SD1. The second terminal of the scan transistor TS1 is electrically connected to the first terminal of the first driving transistor TD1. The control terminal of the scan transistor TS1 receives the scan signal SS. The first terminal of the scan transistor TS2 receives a data signal SD2. The second terminal of the scan transistor TS2 is electrically connected to the first terminal of the second driving transistor TD2. The control terminal of the scan transistor TS2 receives the scan signal SS.

The first terminal of the scan transistor TS3 is electrically connected to the control terminal of the first driving transistor TD1. The second terminal of the scan transistor TS3 is electrically connected to the second terminal of the first driving transistor TD1. The control terminal of the scan transistor TS3 receives the scan signal SS. The first terminal of the scan transistor TS4 is electrically connected to the control terminal of the second driving transistor TD2. The second terminal of the scan transistor TS4 is electrically connected to the second terminal of the second driving transistor TD2. The control terminal of the scan transistor TS4 receives the scan signal SS.

In this embodiment, the light-emitting control transistors TE1 to TE4 are respectively implemented by, for example, P-type transistors, but the disclosure is not limited thereto. The scan transistors TS1 to TS4 are respectively implemented by, for example, N-type transistors, but the disclosure is not limited thereto.

In this embodiment, the design of the first driving transistor TD1 is different from the design of the second driving transistor TD2. Therefore, the current value of the first current I1 generated by the first driving transistor TD1 is higher than the current value of the second current I2 generated by the second driving transistor TD2. For example, the material of the semiconductor layer in the first driving transistor TD1 is different from the material of the semiconductor layer in the second driving transistor TD2. In some embodiments, the first driving transistor TD1 is an LTPS TFT, and the second driving transistor TD2 is an IGZO TFT. Taking this embodiment as an example, the first driving transistor TD1 may be a P-type LTPS TFT, and the second driving transistor TD2 may be an N-type IGZO TFT, but the disclosure is not limited thereto. In some embodiments, through different channel doping concentrations, different channel width-to-length ratios, different bottom gate connection methods, different bottom gate bias voltages, or a combination of the above methods, the operation may achieve the result that the current value of the first current I1 is higher than the current value of the second current I2. In some embodiments, the first driving transistor TD1 and the second driving transistor TD2 may be N-type transistors. In some embodiments, the first driving transistor TD1 and the second driving transistor TD2 may be P-type transistors.

In this embodiment, the first driving transistor TD1 receives the first data signal SD1 according to the scan signal SS and generates the first current I1 or the fourth current I4 according to the first data signal SD1. The second driving transistor TD2 receives the data signal SD2 according to the scan signal SS and generates the second current I2 or the third current I3 according to the data signal SD2.

In this embodiment, similar to the pixel circuit PX1 in FIG. 1 and the pixel circuit PX2 in FIG. 4, the control terminal of the first driving transistor TD1 receives the control signal SG1. The control terminal of the second driving transistor TD2 receives the control signal SG2. The pixel circuit PX3 includes a control signal generation circuit 310. The control signals SG1 and SG2 may be provided by the control signal generation circuit 310.

In this embodiment, the control signal generation circuit 310 generates control signals SG1 and SG2. The control signal generation circuit 310 includes the control transistors TR1 and TR2 and the capacitors C1 and C2. The first terminal of the control transistor TR1 is electrically connected to the reference voltage VR1. The control terminal of the control transistor TR1 receives the reference signal SR. The second terminal of the control transistor TR1 provides the control signal SG1. The first terminal of the control transistor TR2 is electrically connected to the reference voltage VR2. The control terminal of the control transistor TR2 receives the reference signal SR. The second terminal of the control transistor TR2 provides the control signal SG2. The capacitor C1 is electrically connected between the second terminal of the control transistor TR1 and the voltage terminal PVDD. The capacitor C2 is electrically connected between the second terminal of the control transistor TR2 and the voltage terminal PVSS.

In this embodiment, the voltage value of the reference voltage VR1 is a low voltage value. The voltage value of the reference voltage VR2 is a high voltage value. It should be noted that when the pixel circuit PX3 presents the first brightness (for example, the highest brightness or any brightness in the first brightness range) and the second brightness (for example, any brightness in the second brightness range), the first driving transistor TD1 is turned on according to the control signal SG1 during the reset period. When the pixel circuit PX3 presents the first brightness and the second brightness, the second driving transistor TD2 is turned on according to the control signal SG2 during the reset period.

In this embodiment, the control terminals of the scan transistors TS1 to TS4 receive the same scan signal SS. Therefore, during the compensation period, the scan transistors TS1 to TS4 are turned on. The voltage value at the control terminal of the first driving transistor TD1 has the voltage value of the data signal SD1 and is compensated based on the threshold voltage value of the first driving transistor TD1. The voltage value at the control terminal of the second driving transistor TD2 has the voltage value of the data signal SD2 and is compensated based on the threshold voltage value of the second driving transistor TD2.

During the light emitting period, the light-emitting control transistors TE1 to TE4 are turned on. Therefore, the first driving transistor TD1 generates the first current I1 or the fourth current I4 according to the first data signal SD1. The second driving transistor TD2 generates the second current I2 or the third current I3 according to the data signal SD2.

Figure 6:
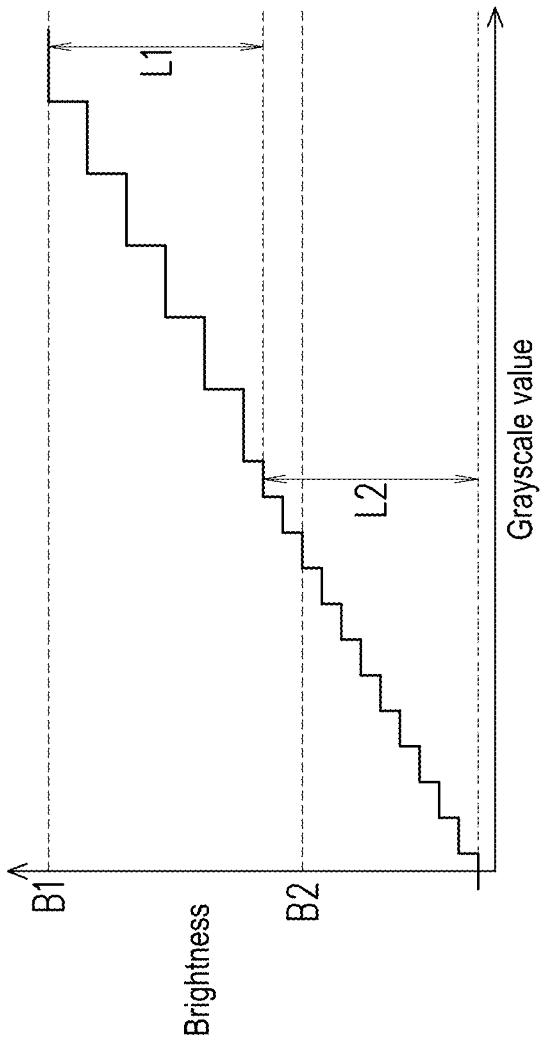
FIG. 6 is a schematic diagram of the brightness range according to an embodiment of the disclosure.

Please refer to FIG. 5 and FIG. 6. FIG. 6 is a schematic diagram of the brightness range according to an embodiment of the disclosure. In this embodiment, the first brightness range L1 is different from the second brightness range L2. For example, the first brightness range L1 and the second brightness range L2 have non-overlapping brightness ranges. The first brightness B1 may be any brightness in the first brightness range L1, the second brightness B2 may be any brightness in the second brightness range L2, and the first brightness B1 is higher than the second brightness B2. In some embodiments, the first brightness B1 may be the highest brightness of the display device 100, or the first brightness B1 may be the highest brightness in the first brightness range L1, but the disclosure is not limited thereto. In this embodiment, the display device may be driven by the first driving transistor TD1 and the second driving transistor TD2, so that the pixel circuit PX3 may present the grayscale change of the first brightness range L1. The display device may be driven by the first driving transistor TD1 and the second driving transistor TD2, so that the pixel circuit PX3 may present the grayscale change of the second brightness range L2. The design allows the pixel circuit PX3 to present more grayscale changes and/or provide finer brightness changes.

For example, when the pixel circuit PX3 presents any brightness in the first brightness range L1 (for example, the first brightness B1), the data signal SD1 has a voltage value corresponding to the first grayscale value range. The first grayscale value range is, for example, from "0" to "255", but the disclosure is not limited thereto. The data signal SD2 has a voltage value corresponding to the maximum grayscale value of the grayscale value range (for example, the grayscale value is "255") or other grayscale values, but the disclosure is not limited thereto. In some embodiments, when the pixel circuit PX3 presents any brightness in the first brightness range L1, the voltage value of the data signal SD2 is a fixed value.

For example, when the pixel circuit PX3 presents any brightness in the second brightness range L2 (for example, the second brightness B2), The data signal SD1 has a voltage value corresponding to the minimum grayscale value of the grayscale value range (for example, the grayscale value is "0"), but the disclosure is not limited thereto. In some embodiments, when the pixel circuit PX3 presents any brightness in the second brightness range L2, the voltage value of the data signal SD1 is a fixed value. The data signal SD2 has a voltage value corresponding to the second grayscale value range. The second grayscale value range is, for example, from "0" to "255" or from "0" to "50", but the disclosure is not limited thereto.

In a modified embodiment of the pixel circuit PX3, the first driving transistor TD1 and the second driving transistor TD2 may be P-type LTPS TFTs. In the modified embodiment, the control signals SG1 and SG2 may be provided by the control signal generation circuit. In the modified embodiment, what is different from the control signal generation circuit 310 is that the first terminal of the control transistor TR1 is electrically connected to the reference voltage VR. The first terminal of the control transistor TR2 is electrically connected to the reference voltage VR. The capacitor C2 is electrically connected between the second terminal of the control transistor TR2 and the voltage terminal PVDD.

In this embodiment, the pixel circuit PX3 may operate in an individual driving mode. In the individual driving mode, when one of the plurality of the pixel circuits PX3 presents the first brightness, another one of the plurality of the pixel circuits PX3 may present the first brightness, the second brightness, or other brightness.

Figure 7:
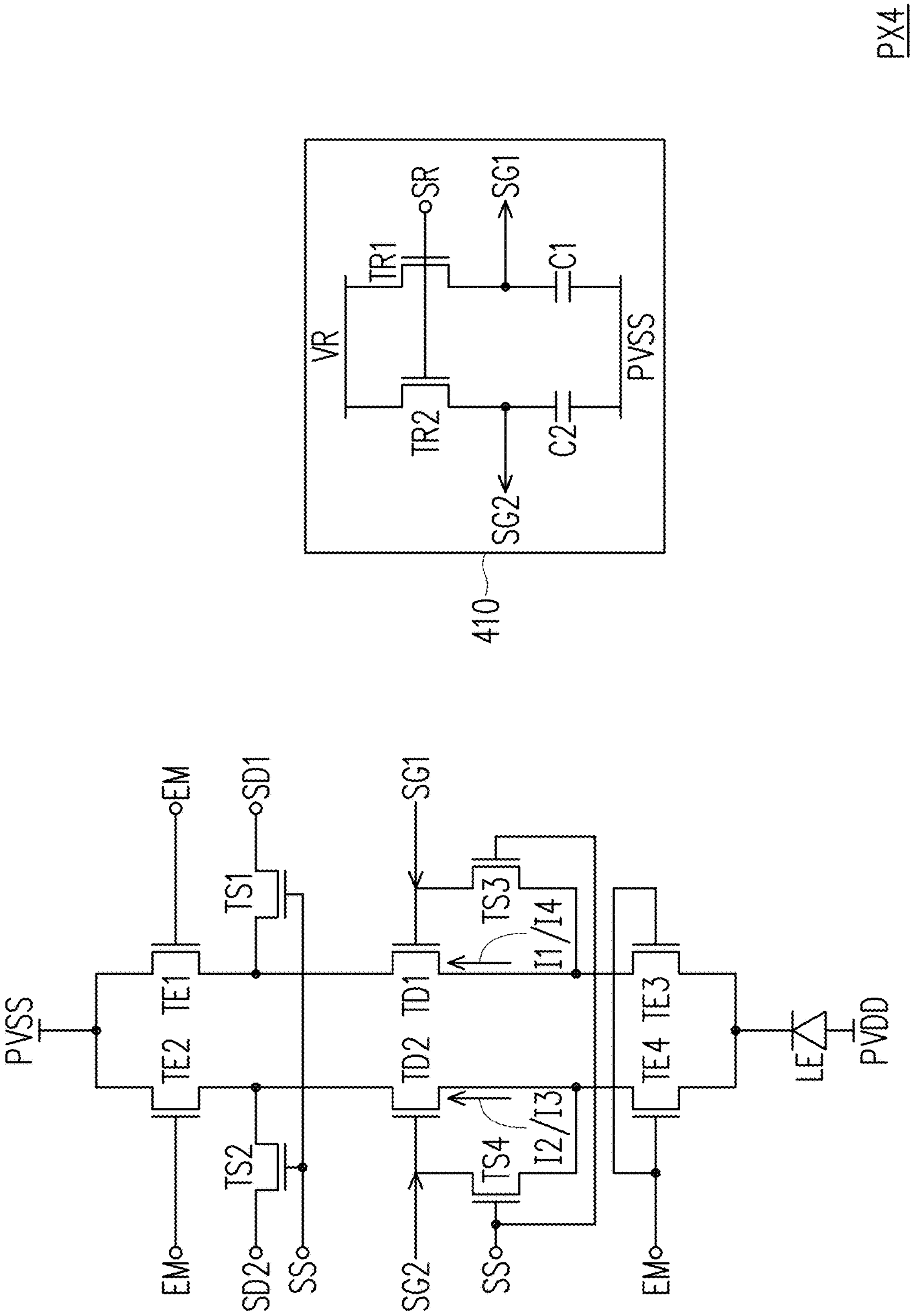
FIG. 7 is a schematic diagram of the pixel circuit according to an embodiment of the disclosure.

In the modified embodiment, through different channel doping concentrations in the semiconductor layer, different channel width-to-length ratios, different bottom gate connection methods, different bottom gate bias voltages, or a combination of the above methods, the operation may achieve the result that the current value of the first current I1 is higher than the current value of the second current I2. For example, the channel doping concentration in the first driving transistor TD1 is higher than the channel doping concentration in the second driving transistor TD2. For another example, the channel width-to-length ratio in the first driving transistor TD1 is higher than the channel width-to-length ratio in the second driving transistor TD2. Please refer to FIG. 7. FIG. 7 is a schematic diagram of the pixel circuit according to an embodiment of the disclosure. In this embodiment, a pixel circuit PX4 includes the first driving transistor TD1, the second driving transistor TD2, the light-emitting control transistors TE1 to TE4, the scan transistor TS1 to TS4, and the light emitting diode LE. In this embodiment, when the pixel circuit PX4 presents the first brightness (for example, the highest brightness or any brightness in the first brightness range), the light emitting diode LE obtains the first current I1 through the first driving transistor TD1 and obtains the third current I3 through the second driving transistor TD2. When the pixel circuit PX4 presents the second brightness (for example, any brightness in the second brightness range), the light emitting diode LE obtains the fourth current I4 through the first driving transistor TD1 and obtains the second current I2 through the second driving transistor TD2. The first brightness is higher than the second brightness. The current value of the first current I1 is higher than the current value of the second current I2.

In some embodiments, when the pixel circuit PX4 presents the first brightness, the first current I2 provided by the first driving transistor TD1 is higher than the third current I3 provided by the second driving transistor TD2. In some embodiments, when the pixel circuit PX4 presents the second brightness, the fourth current I4 provided by the first driving transistor TD1 is lower than the second current I2 provided by the second driving transistor TD2. For example, the fourth current I4 may be equal to 0.

In this embodiment, the first terminal of the light-emitting control transistor TE1 is electrically connected to the voltage terminal PVSS. The second terminal of the light-emitting control transistor TE1 is electrically connected to the first terminal of the first driving transistor TD1. The control terminal of the light-emitting control transistor TE1 receives the light-emitting enable signal EM. The first terminal of the light-emitting control transistor TE2 is electrically connected to the voltage terminal PVSS. The second terminal of the light-emitting control transistor TE2 is electrically connected to the first terminal of the second driving transistor TD2. The control terminal of the light-emitting control transistor TE2 receives the light-emitting enable signal EM.

The first terminal of the light-emitting control transistor TE3 is electrically connected to the second terminal of the first driving transistor TD1. The second terminal of the light-emitting control transistor TE3 is electrically connected to the first terminal of the light emitting diode LE. The control terminal of the light-emitting control transistor TE3 receives the light-emitting enable signal EM. The first terminal of the light-emitting control transistor TE4 is electrically connected to the second terminal of the second driving transistor TD2. The second terminal of the light-emitting control transistor TE4 is electrically connected to the first terminal of the light emitting diode LE. The control terminal of the light-emitting control transistor TE4 receives the light-emitting enable signal EM.

The second terminal of the light emitting diode LE is connected to the voltage terminal PVDD. The voltage value of the voltage terminal PVDD is higher than the voltage value of the voltage terminal PVSS.

The first terminal of the scan transistor TS1 receives the data signal SD1. The second terminal of the scan transistor TS1 is electrically connected to the first terminal of the first driving transistor TD1. The control terminal of the scan transistor TS1 receives the scan signal SS. The first terminal of the scan transistor TS2 receives the data signal SD2. The second terminal of the scan transistor TS2 is electrically connected to the first terminal of the second driving transistor TD2. The control terminal of the scan transistor TS2 receives the scan signal SS.

The first terminal of the scan transistor TS3 is electrically connected to the control terminal of the first driving transistor TD1. The second terminal of the scan transistor TS3 is electrically connected to the second terminal of the first driving transistor TD1. The control terminal of the scan transistor TS3 receives the scan signal SS. The first terminal of the scan transistor TS4 is electrically connected to the control terminal of the second driving transistor TD2. The second terminal of the scan transistor TS4 is electrically connected to the second terminal of the second driving transistor TD2. The control terminal of the scan transistor TS4 receives the scan signal SS.

In this embodiment, the light-emitting control transistors TE1 to TE4 and the scan transistors TS1 to TS4 are respectively implemented by, for example, N-type transistors, but the disclosure is not limited thereto.

In this embodiment, the design of the first driving transistor TD1 is different from the design of the second driving transistor TD2. Therefore, the current value of the first current I1 generated by the first driving transistor TD1 is higher than the current value of the second current I2 generated by the second driving transistor TD2. For example, the material of the semiconductor layer in the first driving transistor TD1 is different from the material of the semiconductor layer in the second driving transistor TD2. Taking this embodiment as an example, the first driving transistor TD1 may be an N-type LTPS TFT, and the second driving transistor TD2 may be an N-type IGZO TFT, but the disclosure is not limited thereto.

In this embodiment, similar to the pixel circuit PX1 in FIG. 1 and the pixel circuit PX2 in FIG. 4, the control terminal of the first driving transistor TD1 receives the control signal SG1. The control terminal of the second driving transistor TD2 receives the control signal SG2. The pixel circuit PX4 includes a control signal generation circuit 410. The control signals SG1 and SG2 may be provided by the control signal generation circuit 410.

In this embodiment, the control signal generation circuit 410 generates the control signals SG1 and SG2. The control signal generation circuit 410 includes the control transistors TR1 and TR2 and the capacitors C1 and C2. The first terminal of the control transistor TR1 is electrically connected to the reference voltage VR. The control terminal of the control transistor TR1 receives the reference signal SR. The second terminal of the control transistor TR1 provides the control signal SG1. The first terminal of the control transistor TR2 is electrically connected to the reference voltage VR. The control terminal of the control transistor TR2 receives the reference signal SR. The second terminal of the control transistor TR2 provides the control signal SG2. The capacitor C1 is electrically connected between the second terminal of the control transistor TR1 and the voltage terminal PVSS (or the voltage terminal PVDD). The capacitor C2 is electrically connected between the second terminal of the control transistor TR2 and the voltage terminal PVSS (or the voltage terminal PVDD).

In this embodiment, the voltage value of the reference voltage VR is a high voltage value. It should be noted that when the pixel circuit PX4 presents the first brightness (for example, the highest brightness or any brightness in the first brightness range) and the second brightness (for example, any brightness in the second brightness range), the first driving transistor TD1 is turned on according to the control signal SG1 during the reset period. When the pixel circuit PX4 presents the first brightness and the second brightness, the second driving transistor TD2 is turned on according to the control signal SG2 during the reset period.

In this embodiment, the control terminals of the scan transistors TS1 to TS4 receive the same scan signal SS. Therefore, during the compensation period, the scan transistors TS1 to TS4 are turned on. The voltage value at the control terminal of the first driving transistor TD1 has the voltage value of the data signal SD1 and is compensated based on the threshold voltage value of the first driving transistor TD1. The voltage value at the control terminal of the second driving transistor TD2 has the voltage value of the data signal SD2 and is compensated based on the threshold voltage value of the second driving transistor TD2.

During the light emitting period, the light-emitting control transistors TE1 to TE4 are turned on. Therefore, the first driving transistor TD1 generates the first current I1 or the fourth current I4 according to the first data signal SD1. The second driving transistor TD2 generates the second current I2 or the third current I3 according to the data signal SD2.

The first data signal SD1 and the data signal SD2 when presenting the first brightness range or the second brightness range have been illustrated in the embodiment of FIG. 5, so details will not be repeated here. In this embodiment, the pixel circuit PX4 is applicable to the first brightness range L1 and the second brightness range L2 as shown in FIG. 6. The pixel circuit PX4 may be applied to the individual driving mode.

In a modified embodiment of the pixel circuit PX4, the first driving transistor TD1 and the second driving transistor TD2 may be N-type LTPS TFTs.

Figure 8:
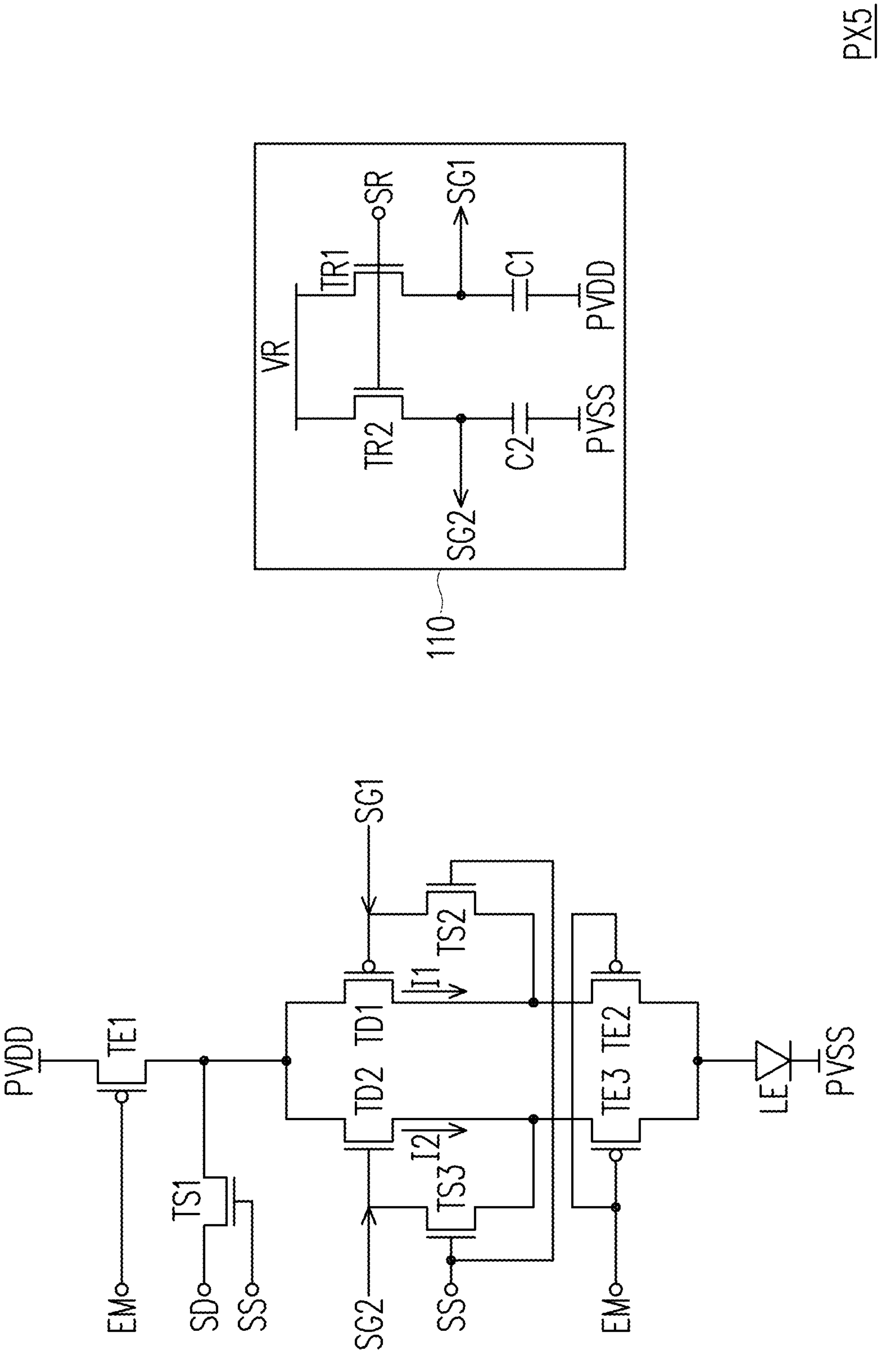
FIG. 8 is a schematic diagram of the pixel circuit according to an embodiment of the disclosure.

Please refer to FIG. 8. FIG. 8 is a schematic diagram of the pixel circuit according to an embodiment of the disclosure. In this embodiment, a pixel circuit PX5 includes the first driving transistor TD1, the second driving transistor TD2, the light-emitting control transistors TE1 to TE3, the scan transistor TS1 to TS3, and the light emitting diode LE. In this embodiment, when the pixel circuit PX5 presents the first brightness (for example, the highest brightness of the first brightness range), the light emitting diode LE obtains the first current I1 through the first driving transistor TD1 and obtains the second current through the second driving transistor TD2. I2. When the pixel circuit PX5 presents the second brightness (for example, any brightness in the second brightness range), the light emitting diode LE obtains the second current I2 through the second driving transistor TD2. The first brightness is higher than the second brightness. The current value of the first current I1 is higher than the current value of the second current I2.

In this embodiment, the first terminal of the light-emitting control transistor TE1 is electrically connected to the voltage terminal PVDD. The second terminal of the light-emitting control transistor TE1 is electrically connected to the first terminal of the first driving transistor TD1. The control terminal of the light-emitting control transistor TE1 receives the light-emitting enable signal EM. The first terminal of the light-emitting control transistor TE2 is electrically connected to the second terminal of the first driving transistor TD1. The second terminal of the light-emitting control transistor TE2 is electrically connected to the first terminal of the light emitting diode LE. The control terminal of the light-emitting control transistor TE2 receives the light-emitting enable signal EM. The first terminal of the light-emitting control transistor TE3 is electrically connected to the second terminal of the second driving transistor TD2. The second terminal of the light-emitting control transistor TE3 is electrically connected to the first terminal of the light emitting diode LE. The control terminal of the light-emitting control transistor TE3 receives the light-emitting enable signal EM.

The second terminal of the light emitting diode LE is connected to the voltage terminal PVSS. The voltage value of the voltage terminal PVDD is higher than the voltage value of the voltage terminal PVSS.

The first terminal of the scan transistor TS1 receives the data signal SD. The second terminal of the scan transistor TS1 is electrically connected to the first terminal of the first driving transistor TD1 and the first terminal of the second driving transistor TD2. The control terminal of the scan transistor TS1 receives the scan signal SS. The first terminal of the scan transistor TS2 is electrically connected to the control terminal of the first driving transistor TD1. The second terminal of the scan transistor TS2 is electrically connected to the second terminal of the first driving transistor TD1. The control terminal of the scan transistor TS2 receives the scan signal SS. The first terminal of the scan transistor TS3 is electrically connected to the control terminal of the second driving transistor TD2. The second terminal of the scan transistor TS3 is electrically connected to the second terminal of the second driving transistor TD2. The control terminal of the scan transistor TS3 receives the scan signal SS.

In this embodiment, the light-emitting control transistors TE1 to TE3 are respectively implemented by, for example, P-type transistors, but the disclosure is not limited thereto. The scan transistors TS1 to TS3 are respectively implemented by, for example, N-type transistors, but the disclosure is not limited thereto.

In this embodiment, the design of the first driving transistor TD1 is different from the design of the second driving transistor TD2. Therefore, the current value of the first current I1 generated by the first driving transistor TD1 is higher than the current value of the second current I2 generated by the second driving transistor TD2. For example, the material of the semiconductor layer in the first driving transistor TD1 is different from the material of the semiconductor layer in the second driving transistor TD2. In some embodiments, the first driving transistor TD1 is an LTPS TFT, and the second driving transistor TD2 is an IGZO TFT. Taking this embodiment as an example, the first driving transistor TD1 may be a P-type LTPS TFT, and the second driving transistor TD2 may be an N-type IGZO TFT, but the disclosure is not limited thereto. In some embodiments, through different channel doping concentrations, different channel width-to-length ratios, different bottom gate connection methods, different bottom gate bias voltages, or a combination of the above methods, the operation may achieve the result that the current value of the first current I1 is higher than the current value of the second current I2.

In this embodiment, the first driving transistor TD1 receives the data signal SD according to the scan signal SS and generates the first current I1 according to the data signal SD. The second driving transistor TD2 receives the data signal SD according to the scan signal SS and generates the second current I2 according to the data signal SD.

In this embodiment, the control terminal of the first driving transistor TD1 receives the control signal SG1. The control terminal of the second driving transistor TD2 receives the control signal SG2. For example, the control signals SG1 and SG2 may be provided by the control signal generation circuit 110 in FIG. 1.

Figure 9:
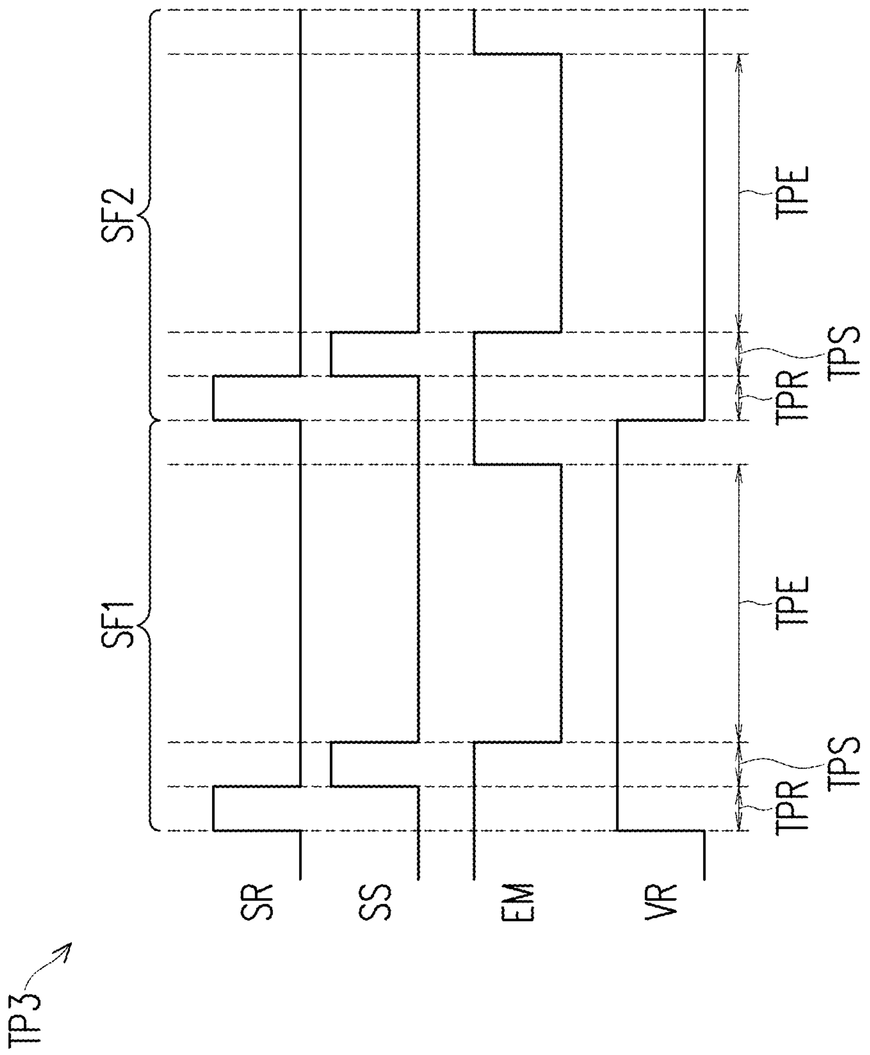
FIG. 9 is a signal timing diagram according to an embodiment of the disclosure.

Please refer to FIG. 8 and FIG. 9. FIG. 9 is a signal timing diagram TP3 according to an embodiment of the disclosure. In this embodiment, one frame time may be divided into a first subframe time SF1 and a second subframe time SF2, but the disclosure is not limited thereto. At the first subframe time SF1, the first driving transistor TD1 is turned on. The light emitting diode LE may use the first current I1 to provide the light of the first brightness range. At the second subframe time SF2, the second driving transistor TD2 is turned on. The light emitting diode LE may use the second current I2 to provide the light of the second brightness range. The first brightness range is greater than the second brightness range. For example, the first subframe time SF1 and the second subframe time SF2 each include the reset period TPR, a scanning period TPS, and the light emitting period TPE. The reference signal SR is a high voltage value during the reset period TPR, and is a low voltage value during the scan period TPS and the light emitting period TPE. The scan signal SS is a high voltage value during the scan period TPS, and is a low voltage value during the reset period TPR and the light emitting period TPE. The light-emitting enable signal EM is a high voltage value during the reset period TPR and the scanning period TPS, and is a low voltage value during the light emitting period TPE.

In this embodiment, in the first subframe time SF1, the voltage value of the reference voltage VR is a high voltage value, so that the first driving transistor TD1 is turned on. Then, during the light emitting period TPE, the first current I1 is generated based on the voltage value at the control terminal of the first transistor TD1. In the second subframe time SF2, the voltage value of the reference voltage VR is a low voltage value, so that the second driving transistor TD2 is turned on. Then, during the light emitting period TPE, the second current I2 is generated based on the voltage value at the control terminal of the second transistor TD2. In this embodiment, the first driving transistor TD1 and the second driving transistor TD2 are not turned on at the same time. That is, when the first driving transistor TD1 is turned on, the second driving transistor TD2 is turned off. When the second driving transistor TD2 is turned on, the first driving transistor TD1 is turned off. The data signal SD when the first driving transistor TD1 is turned on may be the same as or different from the data signal SD when the second driving transistor TD2 is turned on.

In this embodiment, the pixel circuit PX5 may meet the requirements for high-resolution use.

In a modified embodiment of the pixel circuit PX5, the first driving transistor TD1 and the second driving transistor TD2 may be P-type LTPS TFTs. In the modified embodiment, the control signals SG1 and SG2 may be provided by the control signal generation circuit. In the modified embodiment, what is different from the control signal generation circuit 110 is that the first terminal of the control transistor TR1 is electrically connected to the reference voltage VR1. The first terminal of the control transistor TR2 is electrically connected to the reference voltage VR2. The capacitor C2 is electrically connected between the second terminal of the control transistor TR2 and the voltage terminal PVDD.

In this embodiment, the pixel circuit PX5 is applicable to the first brightness range L1 and the second brightness range L2 as shown in FIG. 3. The pixel circuit PX5 may be applied to the individual driving mode.

Figure 10:
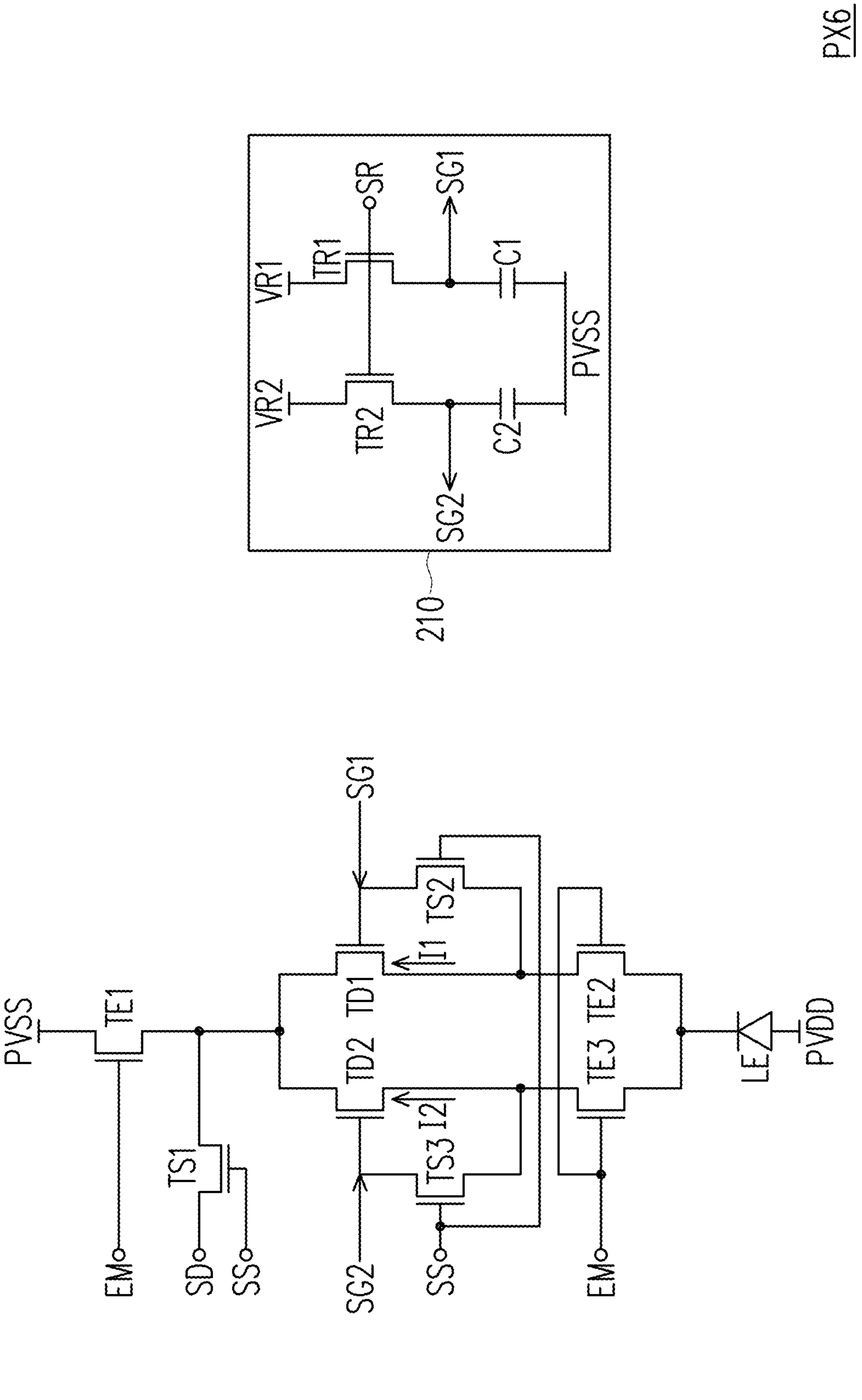
FIG. 10 is a schematic diagram of the pixel circuit according to an embodiment of the disclosure.

Please refer to FIG. 10. FIG. 10 is a schematic diagram of the pixel circuit according to an embodiment of the disclosure. In this embodiment, a pixel circuit PX6 includes the first driving transistor TD1, the second driving transistor TD2, the light-emitting control transistors TE1 to TE3, the scan transistor TS1 to TS3, and the light emitting diode LE. In this embodiment, when the pixel circuit PX6 presents the first brightness (for example, the highest brightness of the first brightness range), the light emitting diode LE obtains the first current I1 through the first driving transistor TD1 and obtains the second current through the second driving transistor TD2. I2. When the pixel circuit PX3 presents the second brightness (for example, any brightness in the second brightness range), the light emitting diode LE obtains the second current I2 through the second driving transistor TD2. The first brightness is higher than the second brightness. The current value of the first current I1 is higher than the current value of the second current I2.

In this embodiment, the first terminal of the light-emitting control transistor TE1 is electrically connected to the voltage terminal PVSS. The second terminal of the light-emitting control transistor TE1 is electrically connected to the first terminal of the first driving transistor TD1. The control terminal of the light-emitting control transistor TE1 receives the light-emitting enable signal EM. The first terminal of the light-emitting control transistor TE2 is electrically connected to the second terminal of the first driving transistor TD1. The second terminal of the light-emitting control transistor TE2 is electrically connected to the first terminal of the light emitting diode LE. The control terminal of the light-emitting control transistor TE2 receives the light-emitting enable signal EM. The first terminal of the light-emitting control transistor TE3 is electrically connected to the second terminal of the second driving transistor TD2. The second terminal of the light-emitting control transistor TE3 is electrically connected to the first terminal of the light emitting diode LE. The control terminal of the light-emitting control transistor TE3 receives the light-emitting enable signal EM.

The second terminal of the light emitting diode LE is connected to the voltage terminal PVDD. The voltage value of the voltage terminal PVDD is higher than the voltage value of the voltage terminal PVSS.

The first terminal of the scan transistor TS1 receives the data signal SD. The second terminal of the scan transistor TS1 is electrically connected to the first terminal of the first driving transistor TD1 and the first terminal of the second driving transistor TD2. The control terminal of the scan transistor TS1 receives the scan signal SS. The first terminal of the scan transistor TS2 is electrically connected to the control terminal of the first driving transistor TD1. The second terminal of the scan transistor TS2 is electrically connected to the second terminal of the first driving transistor TD1. The control terminal of the scan transistor TS2 receives the scan signal SS. The first terminal of the scan transistor TS3 is electrically connected to the control terminal of the second driving transistor TD2. The second terminal of the scan transistor TS3 is electrically connected to the second terminal of the second driving transistor TD2. The control terminal of the scan transistor TS3 receives the scan signal SS.

In this embodiment, the light-emitting control transistors TE1 to TE3 and the scan transistors TS1 to TS3 are respectively implemented by, for example, N-type transistors, but the disclosure is not limited thereto.

In this embodiment, the material of the semiconductor layer in the first driving transistor TD1 is different from the material of the semiconductor layer in the second driving transistor TD2. In some embodiments, the first driving transistor TD1 is an LTPS TFT, and the second driving transistor TD2 is an IGZO TFT. Taking this embodiment as an example, the first driving transistor TD1 may be an N-type LTPS TFT, and the second driving transistor TD2 may be an N-type IGZO TFT, but the disclosure is not limited thereto. In some embodiments, the operation of using different semiconductor materials for the first driving transistor TD1 and the second driving transistor TD2 may be combined with the operation of using different channel doping concentrations in the semiconductor layer, different channel width-to-length ratios, different bottom gate connection methods, different bottom gate bias voltages, or the foregoing methods to achieve the result that the current value of the first current I1 is higher than the current value of the second current I2.

In this embodiment, the first driving transistor TD1 receives the data signal SD according to the scan signal SS and generates the first current I1 according to the data signal SD. The second driving transistor TD2 receives the data signal SD according to the scan signal SS and generates the second current I2 according to the data signal SD.

In this embodiment, the control terminal of the first driving transistor TD1 receives the control signal SG1. The control terminal of the second driving transistor TD2 receives the control signal SG2. The control signals SG1 and SG2 may be provided by the control signal generation circuit 210 in FIG. 4.

In this embodiment, the first driving transistor TD1 and the second driving transistor TD2 of the pixel circuit PX6 are not turned on at the same time. When the first driving transistor TD1 is turned on, the second driving transistor TD2 is turned off. When the second driving transistor TD2 is turned on, the first driving transistor TD1 is turned off. The data signal SD when the first driving transistor TD1 is turned on may be the same as or different from the data signal SD when the second driving transistor TD2 is turned on.

In this embodiment, the pixel circuit PX6 may meet the requirements for high-resolution use.

In a modified embodiment of the pixel circuit PX6, the first driving transistor TD1 and the second driving transistor TD2 may be N-type LTPS TFTs.

In this embodiment, the pixel circuit PX6 is applicable to the first brightness range L1 and the second brightness range L2 as shown in FIG. 3. The pixel circuit PX6 may be applied to the individual driving mode.

Figure 11:
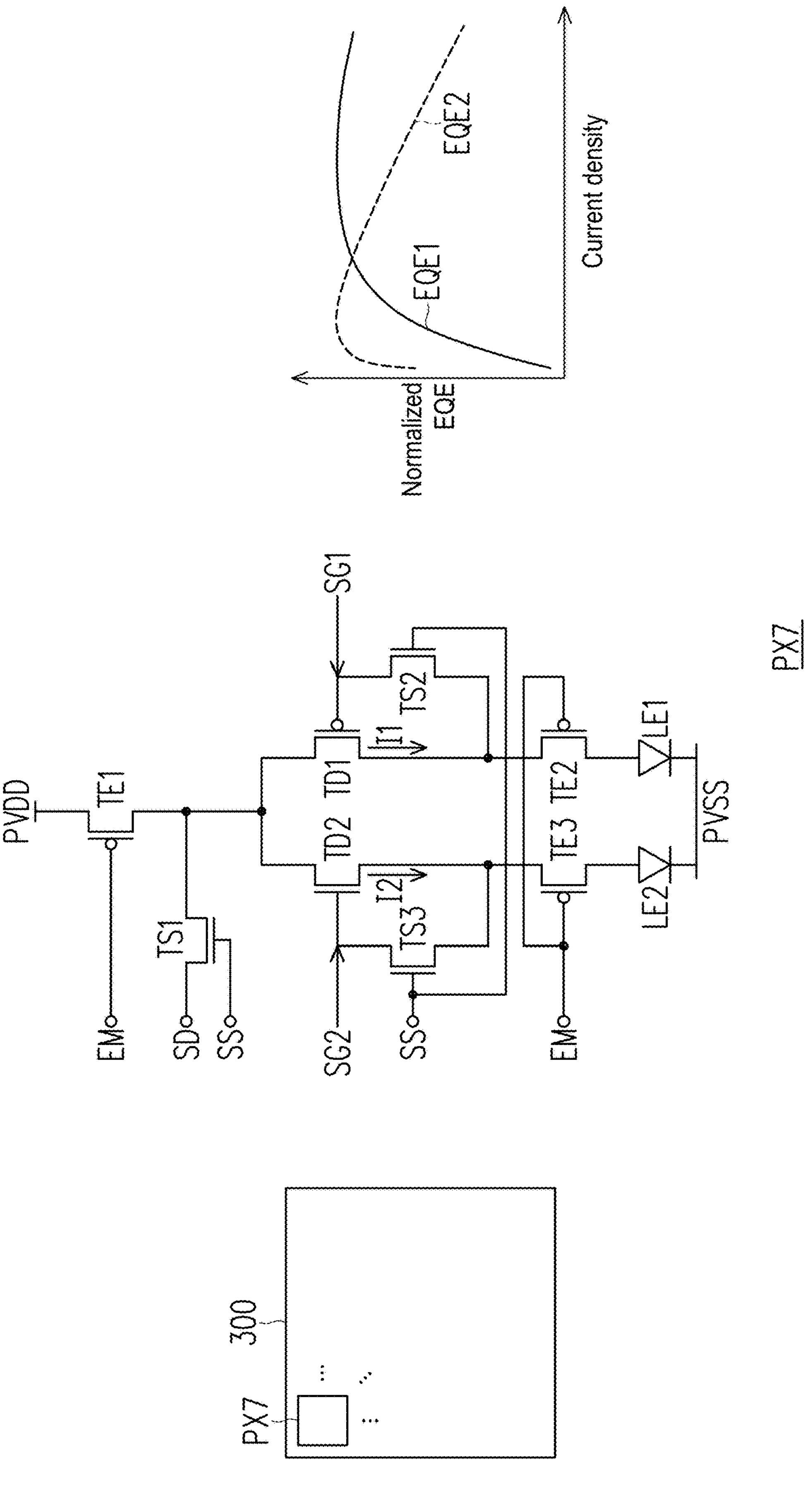
FIG. 11 is a schematic diagram of the pixel circuit of the display device according to an embodiment of the disclosure.

Please refer to FIG. 11. FIG. 11 is a schematic diagram of the pixel circuit of the display device according to an embodiment of the disclosure. In this embodiment, a display device 300 includes at least one pixel circuit PX7. The pixel circuit PX7 includes the first driving transistor TD1, the second driving transistor TD2, a first light emitting diode LE1, and a second light emitting diode LE2. The first driving transistor TD1 is electrically connected to the voltage terminal PVDD. The second driving transistor TD2 is electrically connected to the voltage terminal PVDD. The first light emitting diode LE1 has a first terminal and a second terminal. The first terminal of the first light emitting diode LE1 is electrically connected to the first driving transistor TD1. The second terminal of the first light emitting diode LE1 is electrically connected to the voltage terminal PVSS. The second light emitting diode LE2 has a first terminal and a second terminal. The first terminal of the second light emitting diode LE2 is electrically connected to the second driving transistor TD2. The second terminal of the second light emitting diode LE2 is electrically connected to the voltage terminal PVSS.

When the pixel circuit PX7 presents the first brightness (for example, the highest brightness or any brightness in the first brightness range), the first light emitting diode LE1 obtains the first current I1 through the first driving transistor TD1. When the pixel circuit PX7 presents the second brightness (for example, any brightness in the second brightness range), the second light emitting diode LE2 obtains the second current I2 through the second driving transistor TD2. The first brightness is higher than the second brightness. The current value of the first current I1 is higher than the current value of the second current I2.

In this embodiment, the first light emitting diode LE1 may use the first current I1 to provide the light of the first brightness range. The second light emitting diode LE2 may use the second current I2 to provide the light of the second brightness range.

It is worth mentioning here that the pixel circuit PX7 is applicable to the first brightness range L1 and the second brightness range L2 as shown in FIG. 3, but the disclosure is not limited thereto. Therefore, the display device 300 may use the first current I1 to accurately control the grayscale changes of the first brightness range, and use the second current I2 to accurately control the grayscale changes of the second brightness range. In some embodiments, the pixel circuit PX7 may be applied to the first brightness range L1 and the second brightness range L2 as shown in FIG. 6, but the disclosure is not limited thereto.

In this embodiment, the first terminal of the first driving transistor TD1 is electrically connected to the voltage terminal PVDD. The second terminal of the first driving transistor TD1 is electrically connected to the first terminal of the light emitting diode LE1. The control terminal of the first driving transistor TD1 receives the control signal SG1. The first terminal of the second driving transistor TD2 is electrically connected to the voltage terminal PVDD. The second terminal of the second driving transistor TD2 is electrically connected to the first terminal of the light emitting diode LE2. The control terminal of the second driving transistor TD2 receives the control signal SG2.

The control terminal of the first driving transistor TD1 receives the control signal SG1. The control terminal of the second driving transistor TD2 receives the control signal SG2. The control signals SG1 and SG2 may be provided by the control signal generation circuit 110 in FIG. 1.

In this embodiment, the design of the first driving transistor TD1 is different from the design of the second driving transistor TD2. Therefore, the current value of the first current I1 generated by the first driving transistor TD1 is higher than the current value of the second current I2 generated by the second driving transistor TD2. For example, the material of the semiconductor layer in the first driving transistor TD1 is different from the material of the semiconductor layer in the second driving transistor TD2. In some embodiments, the first driving transistor TD1 is an LTPS TFT, and the second driving transistor TD2 is an IGZO TFT. Taking this embodiment as an example, the first driving transistor TD1 may be a P-type LTPS TFT, and the second driving transistor TD2 may be an N-type IGZO TFT, but the disclosure is not limited thereto. In some embodiments, through different channel doping concentrations, different channel width-to-length ratios, different bottom gate connection methods, different bottom gate bias voltages, or a combination of the above methods, the operation may achieve the result that the current value of the first current I1 is higher than the current value of the second current I2. Taking this embodiment as an example, the pixel circuit PX7 further includes the light-emitting control transistors TE1 to TE3 and the scan transistors TS1 to TS3. The first terminal of the light-emitting control transistor TE1 is electrically connected to the voltage terminal PVDD. The second terminal of the light-emitting control transistor TE1 is electrically connected to the first terminal of the first driving transistor TD1. The control terminal of the light-emitting control transistor TE1 receives the light-emitting enable signal EM. The first terminal of the light-emitting control transistor TE2 is electrically connected to the second terminal of the first driving transistor TD1. The second terminal of the light-emitting control transistor TE2 is electrically connected to the first terminal of the light emitting diode LE1. The control terminal of the light-emitting control transistor TE2 receives the light-emitting enable signal EM. The first terminal of the light-emitting control transistor TE3 is electrically connected to the second terminal of the second driving transistor TD2. The second terminal of the light-emitting control transistor TE3 is electrically connected to the first terminal of the light emitting diode LE2. The control terminal of the light-emitting control transistor TE3 receives the light-emitting enable signal EM.

The first terminal of the scan transistor TS1 receives the data signal SD. The second terminal of the scan transistor TS1 is electrically connected to the first terminal of the first driving transistor TD1 and the first terminal of the second driving transistor TD2. The control terminal of the scan transistor TS1 receives the scan signal SS. The first terminal of the scan transistor TS2 is electrically connected to the control terminal of the first driving transistor TD1. The second terminal of the scan transistor TS2 is electrically connected to the second terminal of the first driving transistor TD1. The control terminal of the scan transistor TS2 receives the scan signal SS. The first terminal of the scan transistor TS3 is electrically connected to the control terminal of the second driving transistor TD2. The second terminal of the scan transistor TS3 is electrically connected to the second terminal of the second driving transistor TD2. The control terminal of the scan transistor TS3 receives the scan signal SS.

In this embodiment, the first light emitting diode LE1 has an external quantum efficiency (EQE) characteristic EQE1. The second light emitting diode LE2 has an external quantum efficiency (EQE) characteristic EQE2. Based on the EQE characteristic EQE1 and the EQE characteristic EQE2, a second current density required for the second light emitting diode LE2 to achieve the optimal EQE is lower than a first current density required for the first light emitting diode LE1 to achieve the optimal EQE. Low current density is suitable for presenting low grayscale or low brightness. High current density is suitable for presenting high grayscale or high brightness. Therefore, the second light emitting diode LE2 is suitable for presenting grayscale changes with low brightness range (that is, the second brightness range), while the first light emitting diode LE1 is suitable for presenting grayscale changes with high brightness range (that is, the first brightness range).

Generally speaking, the peak light wavelength of the first light emitting diode LE1 and the peak light wavelength of the second light emitting diode LE2 decrease with the current density. In this embodiment, the first light emitting diode LE1 is designed to present the first brightness range (for example, grayscale values from "128" to "255") based on the first current density. The second light emitting diode LE2 is designed to present the second brightness range (for example, grayscale values from "0" to "127") based on the second current density. The first current density and the second current density are limited. Therefore, the shift amount of the peak light wavelength of the first light emitting diode LE1 and the peak light wavelength of the second light emitting diode LE2 can be reduced.

In this embodiment, the pixel circuit PX7 may be applied to the individual driving mode or the full-screen driving mode.

Figure 12:
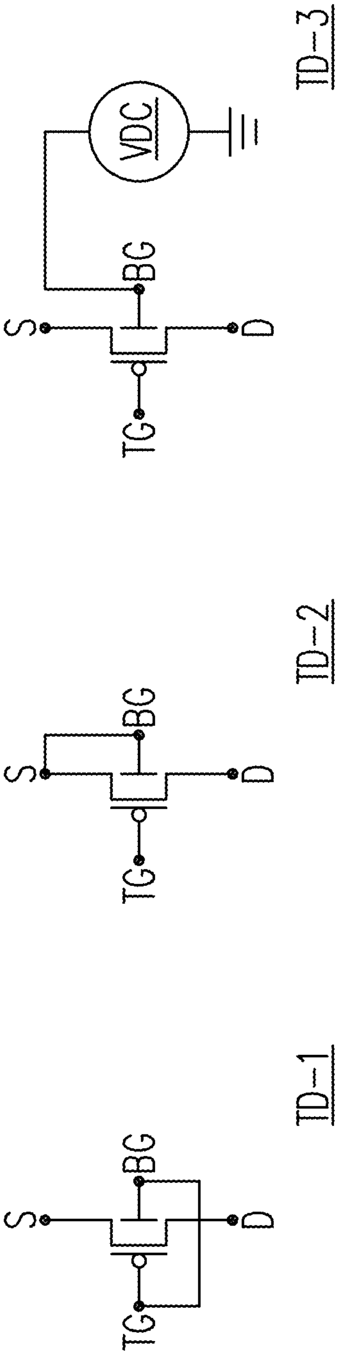
FIG. 12 is a schematic diagram of a driving transistor according to an embodiment of the disclosure.

Please refer to FIG. 1 and FIG. 12. FIG. 12 is a schematic diagram of a driving transistor according to an embodiment of the disclosure. The driving transistor of the disclosure may be, for example, a single gate transistor or a dual gate transistor. A single gate may be, for example, a top gate or a bottom gate. This embodiment shows that driving transistors TD-1, TD-2, and TD-3 are dual gate transistors. In the embodiment, the bottom gates of the driving transistors TD-1, TD-2, and TD-3 have different connection methods. The driving transistors TD-1, TD-2, and TD-3 respectively have a source S (that is, a first terminal), a top gate TG (that is, a control terminal), a bottom gate BG, and a drain D (that is, a second terminal). The bottom gate BG of the driving transistor TD-1 is electrically connected to the top gate TG of the driving transistor TD-1. The bottom gate BG of the driving transistor TD-2 is electrically connected to the source S of the driving transistor TD-2. The current generated by the driving transistor TD-1 is greater than the current generated by the driving transistor TD-2. The current generated by the driving transistor TD-1 is greater than the current generated by a single gate driving transistor (such as the driving transistor TD1 or the driving transistor TD2 in FIG. 1). The current generated by the driving transistor of a single gate is greater than the current generated by the driving transistor TD-2. In this embodiment, the driving transistors TD-1 and TD-2 are both P-type TFTs as an example, but the above-mentioned current magnitude relationship generated by different driving transistors is not limited to the same or different types of TFTs. Therefore, in order to make the first current I1 generated by the first driving transistor TD1 be greater than the second current I2 generated by the second driving transistor TD2, the following implementations are possible. For example, the first driving transistor TD1 and the second driving transistor TD2 are respectively implemented by the driving transistor TD-1 and a single gate transistor. For example, the first driving transistor TD1 and the second driving transistor TD2 are implemented by the driving transistor TD-1 and the driving transistor TD-2 respectively. For example, the first driving transistor TD1 and the second driving transistor TD2 are respectively implemented by a single gate transistor and the driving transistor TD-2.

In this embodiment, the bottom gate BG of the driving transistor TD-3 is electrically connected to a DC voltage source VDC. Taking the driving transistor TD-3 being an N-type TFT as an example, the lower the bias voltage value of the DC voltage source VDC, the lower the current generated by the driving transistor TD-3. Taking the driving transistor TD-3 being a P-type TFT as an example, the higher the bias voltage value of the DC voltage source VDC, the lower the current generated by the driving transistor TD-3. Therefore, when both the first driving transistor TD1 and the second driving transistor TD2 are implemented by the driving transistor TD-3, the bias voltage at the bottom gate of the first driving transistor TD1 may be different from the bias voltage at the bottom gate of the second driving transistor TD2. For example, when the first driving transistor TD1 and the second driving transistor TD2 are both P-type TFTs, the bias voltage value of the DC voltage source VDC provided to the bottom gate of the first driving transistor TD1 is lower than the bias voltage value of the DC voltage source VDC provided to the bottom gate of the second driving transistor TD2. For another example, when the first driving transistor TD1 and the second driving transistor TD2 are both N-type TFTs, the bias voltage value of the DC voltage source VDC provided to the bottom gate of the first driving transistor TD1 is higher than the bias voltage value of the DC voltage source VDC provided to the bottom gate of the second driving transistor TD2.

Based on the above, the bias voltage of the bottom gate of the first driving transistor TD1 and the bias voltage of the bottom gate of the second driving transistor TD2 may be adjusted, so that the first current I1 is greater than the second current I2.

In summary, when the pixel circuit presents the first brightness, the pixel circuit operates based on the first current. When the pixel circuit presents the second brightness, the pixel circuit operates based on the second current. The first brightness is higher than the second brightness. The current value of the first current is higher than the current value of the second current. In this way, the display device can accurately control the grayscale changes of different brightness ranges.

Finally, it should be noted that the embodiments are merely used to illustrate the technical solution of the disclosure, rather than to limit the disclosure. Although the disclosure has been described in detail with reference to the foregoing embodiments, persons of ordinary skill in the art should understand that the persons may still modify the technical solutions recorded in the foregoing embodiments, or make equivalent substitutions for some or all of the technical features. However, the modifications or substitutions do not cause the essence of the corresponding technical solution to deviate from the scope of the technical solution of each embodiment of the disclosure.

What is claimed is:

1. A display device, comprising:

at least one pixel circuit, comprising:

a first driving transistor electrically connected to a first voltage terminal;

a second driving transistor electrically connected to the first voltage terminal; and a light emitting diode having a first terminal and a second terminal, wherein the first terminal is electrically connected to the first driving transistor and the second driving transistor, and the second terminal is electrically connected to a second voltage terminal, and wherein when the at least one pixel circuit presents a first brightness, the light emitting diode obtains a first current through the first driving transistor, when the at least one pixel circuit presenting a second brightness, the light emitting diode obtains a second current through the second driving transistor, the first brightness is higher than the second brightness, and a current value of the first current is higher than a current value of the second current, when the at least one pixel circuit presents the first brightness, the first driving transistor receives a data signal according to a first scan signal and generates the first current according to the data signal, and when the at least one pixel circuit presents the second brightness, the second driving transistor receives the data signal according to a second scan signal and generates the second current according to the data signal.

2. The display device as claimed in claim 1, wherein a material of a semiconductor layer in the first driving transistor is different from a material of a semiconductor layer in the second driving transistor.

3. The display device as claimed in claim 1, wherein a channel width-to-length ratio in the first driving transistor is higher than a channel width-to-length ratio in the second driving transistor.

4. The display device as claimed in claim 1, further comprising:

a logic circuit electrically connected to the at least one pixel circuit, and configured to generate the first scan signal and the second scan signal according to a scan enable signal, a scan signal, and an inverted scan signal.

5. The display device as claimed in claim 1, wherein when the at least one pixel circuit presents the first brightness, the light emitting diode obtains a third current through the second driving transistor.

6. The display device as claimed in claim 5, wherein the first current is higher than the third current.

7. The display device as claimed in claim 5, wherein when the at least one pixel circuit presents the second brightness, the light emitting diode obtains a fourth current through the first driving transistor.

8. The display device as claimed in claim 7, wherein the fourth current is lower than the second current.

9. The display device as claimed in claim 1, wherein when the at least one pixel circuit presents the first brightness, the first driving transistor is turned on according to a first control signal during a reset period, and when the at least one pixel circuit presents the second brightness, the second driving transistor is turned on according to a second control signal during the reset period.

10. The display device as claimed in claim 9, wherein the at least one pixel circuit further comprises:

a control signal generation circuit configured to generate the first control signal and the second control signal according to a reference signal and at least one reference voltage.

11. The display device as claimed in claim 1, wherein the first driving transistor has a first bottom gate terminal, the second driving transistor has a second bottom gate terminal, and a bias voltage at the first bottom gate terminal is different from a bias voltage at the second bottom gate terminal.

12. The display device as claimed in claim 1, wherein the at least one pixel circuit further comprises:

a first scan transistor, wherein a first terminal of the first scan transistor receives the data signal, a second terminal of the first scan transistor is electrically connected to a first terminal of the first driving transistor and a first terminal of the second driving transistor, and a control terminal of the first scan transistor receives the first scan signal; and a second scan transistor, wherein a first terminal of the second scan transistor receives the data signal, a second terminal of the second scan transistor is electrically connected to the first terminal of the first driving transistor and the first terminal of the second driving transistor, and a control terminal of the second scan transistor receives the second scan signal.

13. The display device as claimed in claim 1, wherein the at least one pixel circuit further comprises:

a first scan transistor, wherein a first terminal of the first scan transistor receives a first data signal, a second terminal of the first scan transistor is electrically connected to a first terminal of the first driving transistor, and a control terminal of the first scan transistor receives a scan signal; and a second scan transistor, wherein a first terminal of the second scan transistor receives a second data signal, a second terminal of the second scan transistor is electrically connected to a first terminal of the second driving transistor, and a control terminal of the second scan transistor receives the scan signal.

14. The display device as claimed in claim 1, wherein the at least one pixel circuit further comprises:

a scan transistor, wherein a first terminal of the scan transistor receives a data signal, a second terminal of the scan transistor is electrically connected to a first terminal of the first driving transistor and a first terminal of the second driving transistor, and a control terminal of the scan transistor receives a scan signal.

15. A display device, comprising:

at least one pixel circuit, comprising:

a first driving transistor electrically connected to a first voltage terminal;

a second driving transistor electrically connected to the first voltage terminal; and a first light emitting diode having a first terminal and a second terminal, wherein the first terminal of the first light emitting diode is electrically connected to the first driving transistor, and the second terminal of the first light emitting diode is electrically connected to a second voltage terminal; and a second light emitting diode having a first terminal and a second terminal, wherein the first terminal of the second light emitting diode is electrically connected to the second driving transistor, and the second terminal of the second light emitting diode is electrically connected to the second voltage terminal, wherein when the at least one pixel circuit presents a first brightness, the first light emitting diode obtains a first current through the first driving transistor, when the at least one pixel circuit presenting a second brightness, the second light emitting diode obtains a second current through the second driving transistor, the first brightness is higher than the second brightness, and a current value of the first current is higher than a current value of the second current, and wherein a second current density required for the second light emitting diode to achieve an optimal external quantum efficiency of the second light emitting diode is lower than a first current density required for the first light emitting diode to achieve an optimal external quantum efficiency of the first light emitting diode.

16. The display device as claimed in claim 15, wherein a material of the semiconductor layer in the first driving transistor is different from a material of the semiconductor layer in the second driving transistor.

17. The display device as claimed in claim 15, wherein a channel width-to-length ratio in the first driving transistor is higher than a channel width-to-length ratio in the second driving transistor.

18. The display device as claimed in claim 15, wherein the first driving transistor has a first bottom gate terminal, the second driving transistor has a second bottom gate terminal, and a bias voltage at the first bottom gate terminal is different from a bias voltage at the second bottom gate terminal.

* * * * *